United States Patent
Fujiwara et al.

(10) Patent No.: US 10,723,661 B2
(45) Date of Patent: Jul. 28, 2020

(54) DRYING SHRINKAGE REDUCTION METHOD OF CEMENT-BASED HARDENED BODY

(71) Applicants: UTSUNOMIYA UNIVERSITY, Utsunomiya-Shi (JP); DPS BRIDGE WORKS CO., LTD., Sapporo-Shi (JP); MIZOGUCHIJIGYO CO., LTD., Hakodate-Shi (JP)

(72) Inventors: Hiromi Fujiwara, Koshigaya (JP); Shinichi Takemoto, Sapporo (JP); Yoshikatsu Sasaki, Hakodate (JP)

(73) Assignees: UTSUNOMIYA UNIVERSITY, Tochigi (JP); DPS BRIDGE WORKS CO., LTD., Sapporo-Shi, Hokkaido (JP); MIZOGUCHIJIGYO CO., LTD., Hakodate-Shi, Hokkaido (JP)

( * ) Notice: Subject to any disclaimer, the term of this patent is extended or adjusted under 35 U.S.C. 154(b) by 0 days.

(21) Appl. No.: 16/331,740

(22) PCT Filed: Oct. 2, 2017

(86) PCT No.: PCT/JP2017/035766
§ 371 (c)(1),
(2) Date: Mar. 8, 2019

(87) PCT Pub. No.: WO2018/062564
PCT Pub. Date: Apr. 5, 2018

(65) Prior Publication Data
US 2019/0248710 A1    Aug. 15, 2019

(30) Foreign Application Priority Data

Sep. 30, 2016 (JP) .................................. 2016-193308
Aug. 10, 2017 (JP) .................................. 2017-154987

(51) Int. Cl.
*C04B 41/62* (2006.01)
*C04B 41/00* (2006.01)
(Continued)

(52) U.S. Cl.
CPC .......... *C04B 41/62* (2013.01); *C04B 40/0039* (2013.01); *C04B 41/009* (2013.01); *C04B 41/46* (2013.01); *C04B 2111/34* (2013.01)

(58) Field of Classification Search
CPC ....... C04B 41/45; C04B 41/457; C04B 41/46; C04B 41/60; C04B 24/126; C04B 40/029
See application file for complete search history.

(56) References Cited

U.S. PATENT DOCUMENTS

2006/0175574 A1* 8/2006 Bytnar .................... C09K 3/18
252/71

FOREIGN PATENT DOCUMENTS

JP    62-027386    2/1987
JP    2006-182619 A    7/2006
(Continued)

OTHER PUBLICATIONS

Sadegzadeh et al "Effects of urea on the durability of reinforced concrete" Transport and Road Research Laboratory, Contractor report, 1990, 61 pgs (Year: 1990).*
(Continued)

*Primary Examiner* — Nathan H Empie
(74) *Attorney, Agent, or Firm* — Pearne & Gordon LLP

(57) ABSTRACT

The present invention is to provide an economical and efficient method of reducing drying shrinkage of a cement-based hardened body without requiring the cost and/or the labor and time. A cement-based hardened body is impregnated with a solution containing urea or a solution containing sulfate together with urea. An impregnation treatment may be by a method of coating or spraying the cement-based (Continued)

hardened body with the solution, or alternatively, immersing the cement-based hardened body in the solution containing both urea and sulfate for a predetermined period of time. The solution containing both urea and sulfate may be a solution prepared simply by dissolving both urea and sulfate in water. Besides, there are no particular limitations on a liquid allowing dissolution of both urea and sulfate, so long as it causes no impairment of a drying shrinkage reduction effect, and therefore, a solution having the drying shrinkage reduction effect in itself is also applicable for use of a solution containing both urea and sulfate in a state of being dissolved in such solution.

14 Claims, 7 Drawing Sheets

(51) Int. Cl.
  *C04B 41/46* (2006.01)
  *C04B 40/00* (2006.01)
  *C04B 111/34* (2006.01)

(56) References Cited

FOREIGN PATENT DOCUMENTS

| | | | |
|---|---|---|---|
| JP | 2008-260687 A | | 10/2008 |
| JP | 2009209651 A | * | 9/2009 |
| JP | 2013-253015 A | | 12/2013 |
| JP | 2015-034119 A | | 2/2015 |
| JP | 2015-189628 A | | 11/2015 |

OTHER PUBLICATIONS

Webcapture of https://sciencing.com/physical-properties-urea-6369247.html Oct. 4, 2019 (Year: 2019).*
Kawai, T., et al., "Various Properties of Concrete Using Urea", Annual Concrete Research and Technology, 2007, vol. 29, No. 1, pp. 639-644.
International Search Report for PCT/JP2017/035766, dated Nov. 21, 2017.

* cited by examiner

[Fig. 1]
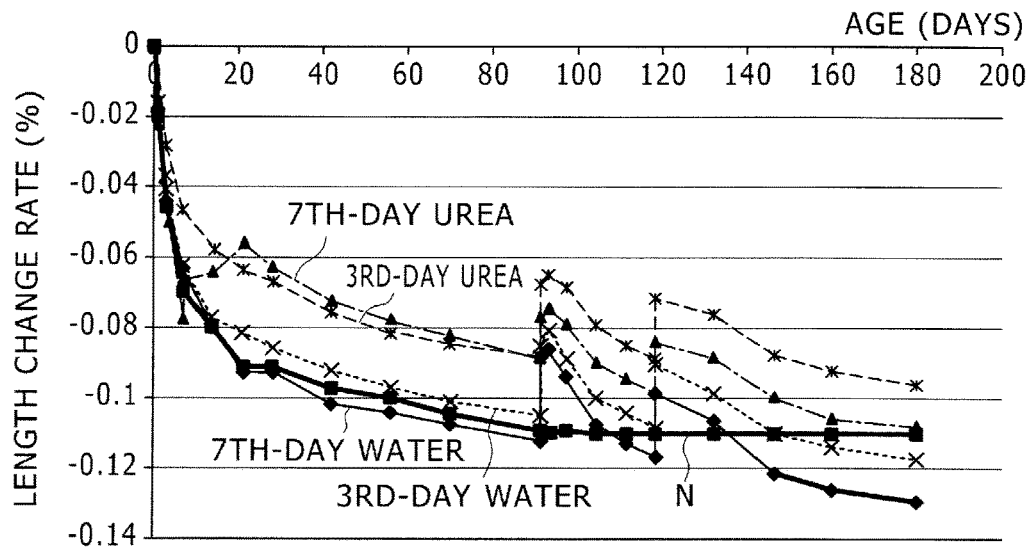
[Fig. 2]
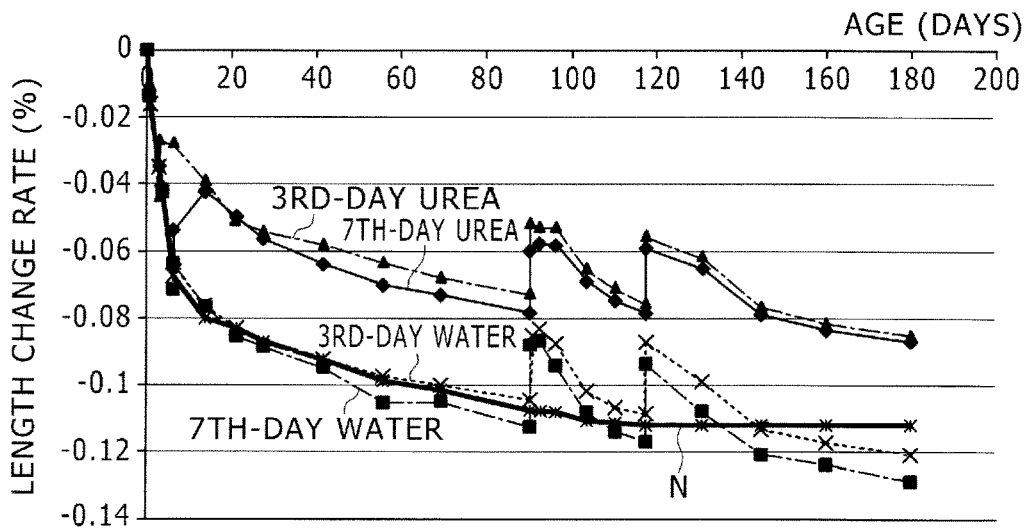
[Fig. 3]
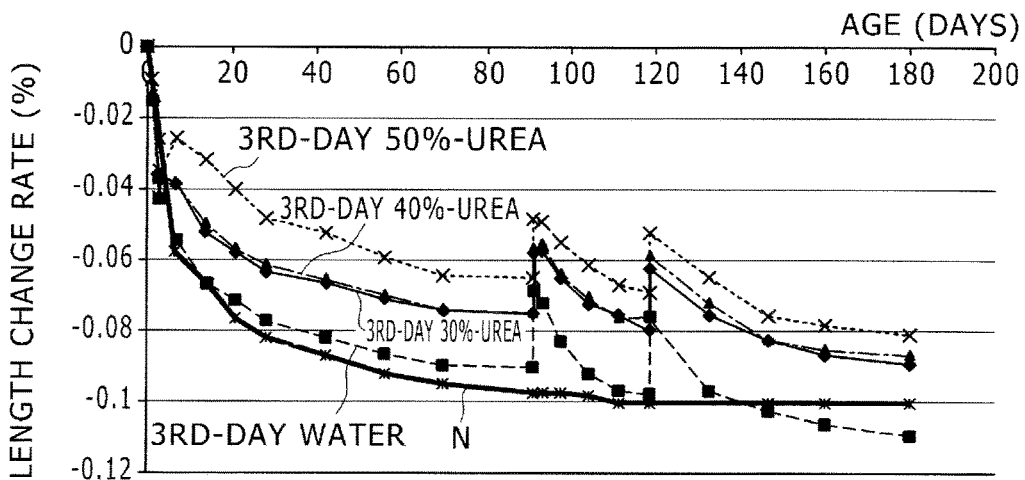

[Fig. 4]
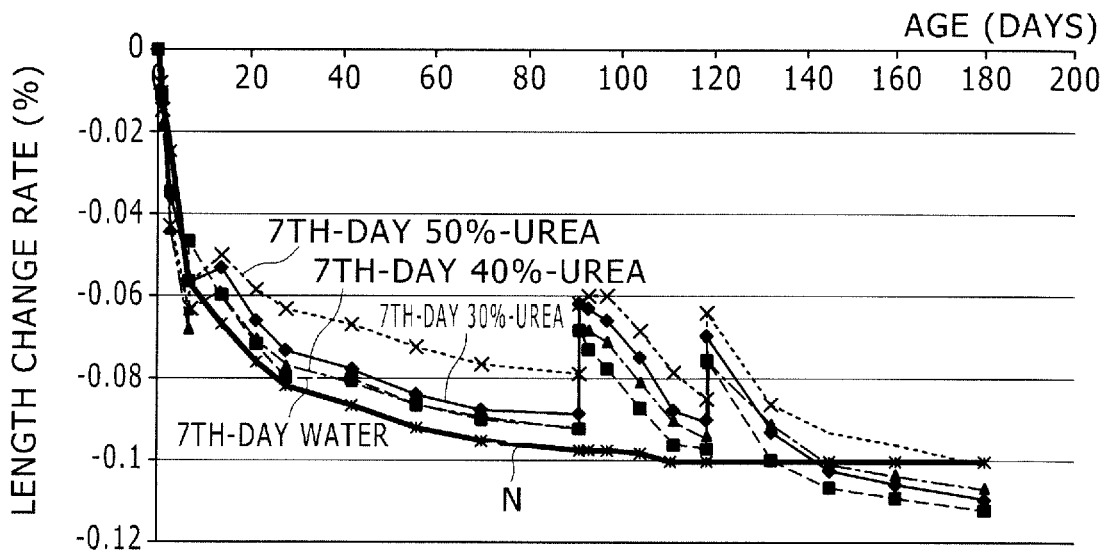
[Fig. 5]
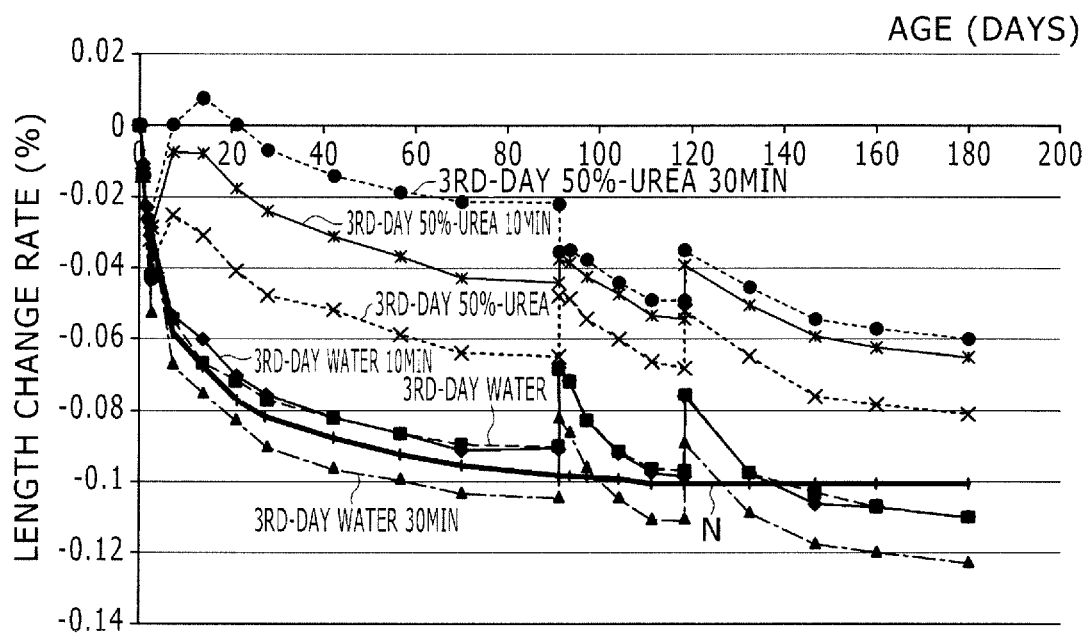

[Fig. 6]
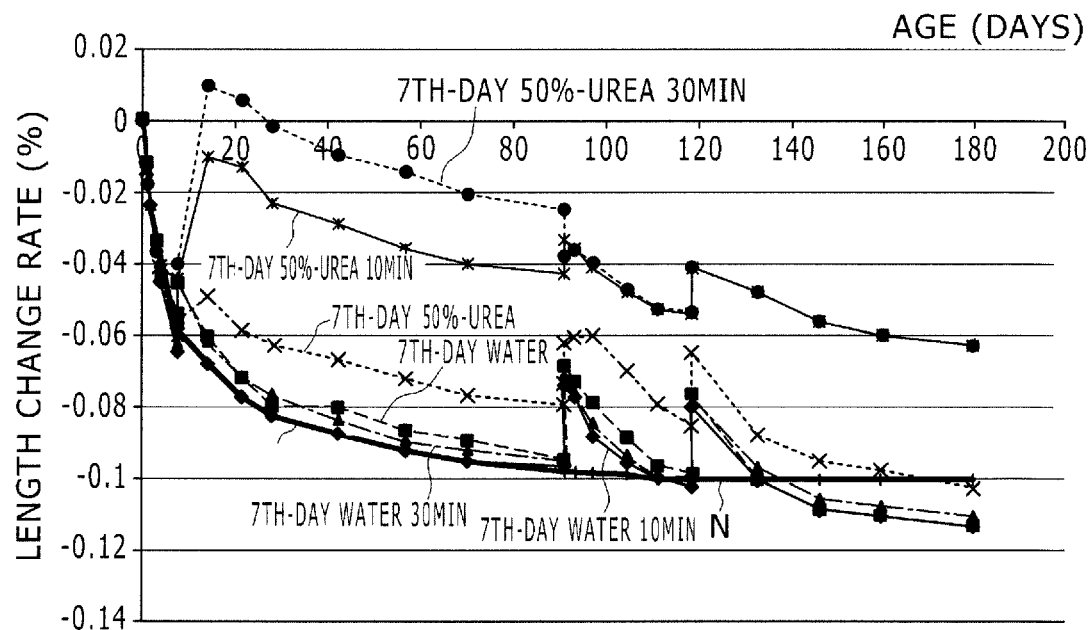
[Fig. 7]
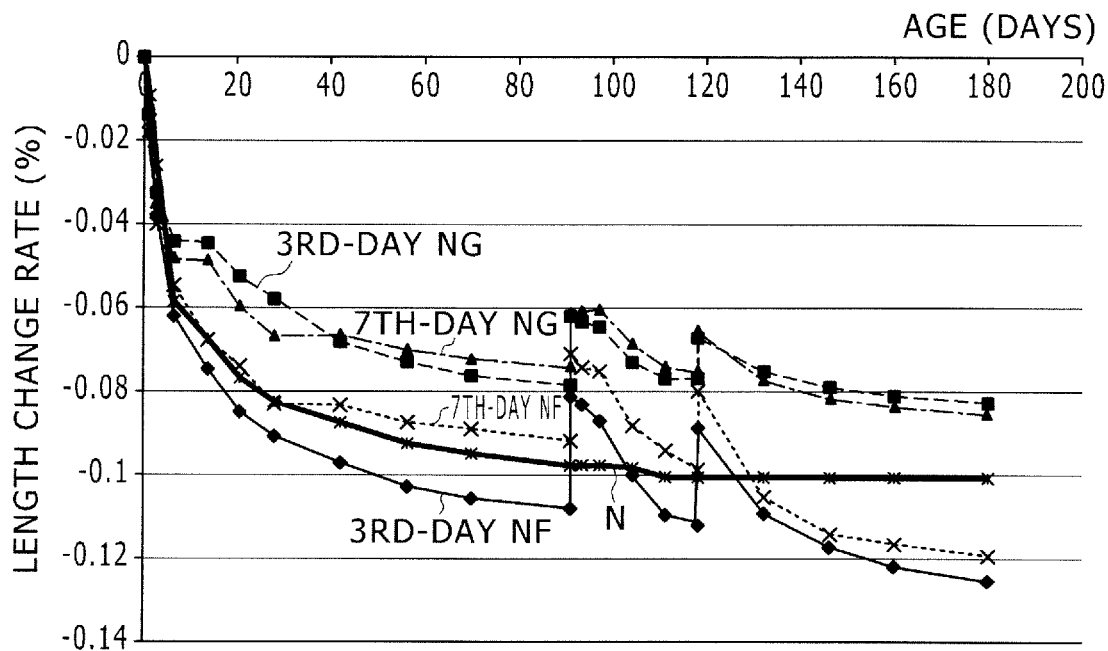

[Fig. 8]
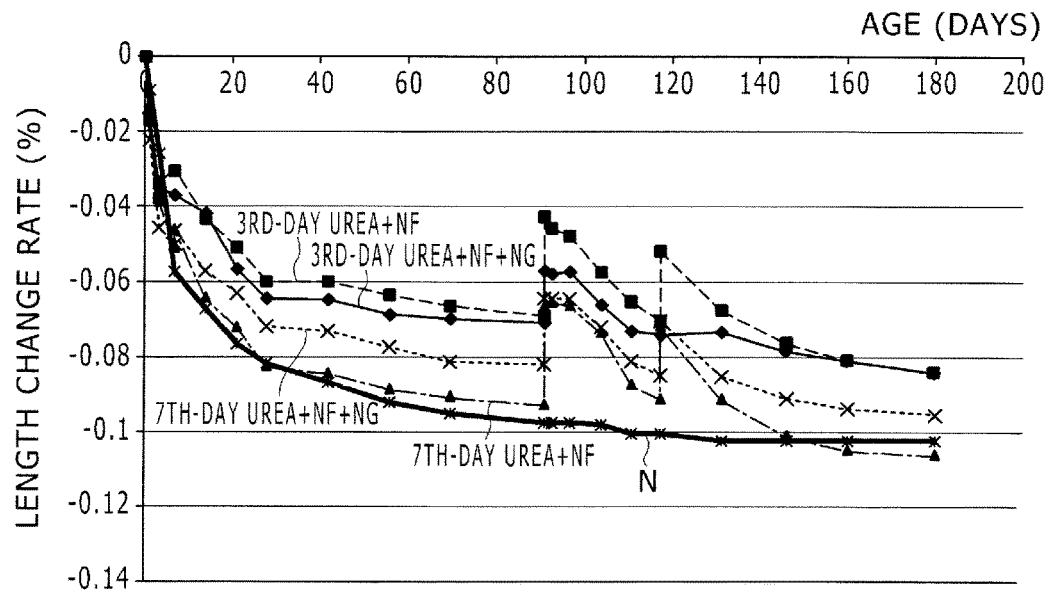
[Fig. 9]
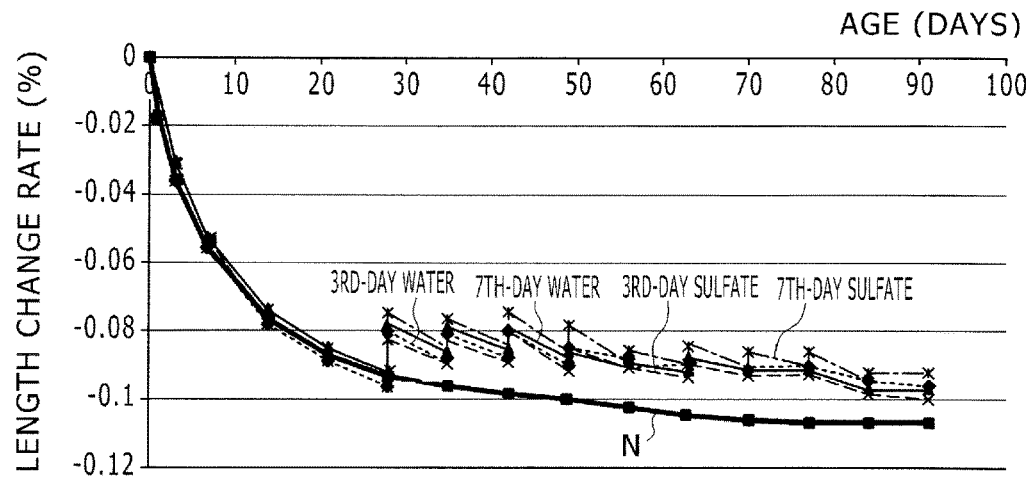
[Fig. 10]
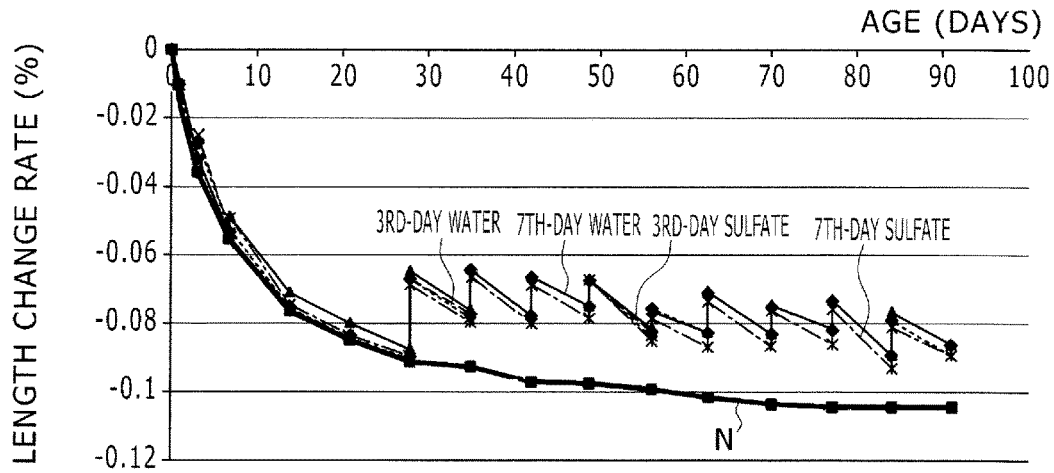

[Fig. 11]
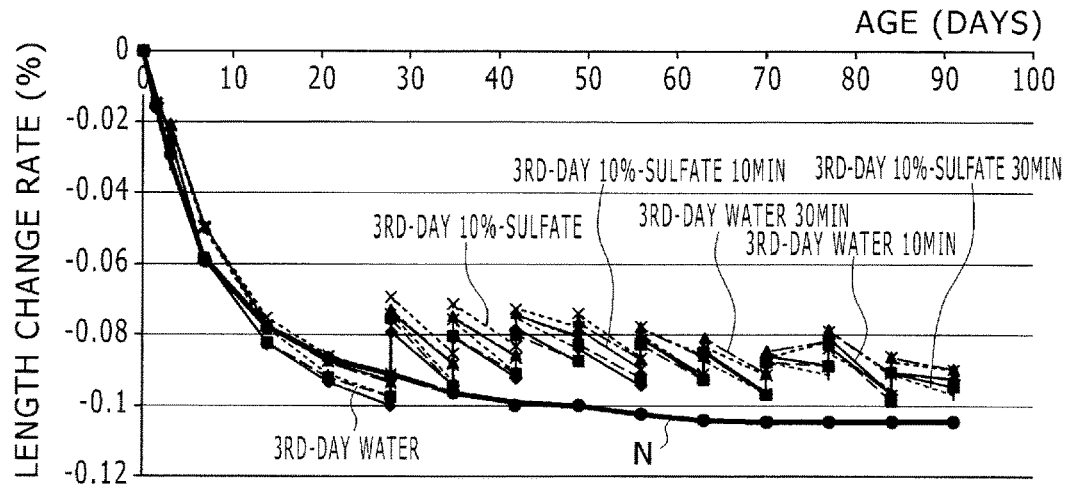
[Fig. 12]
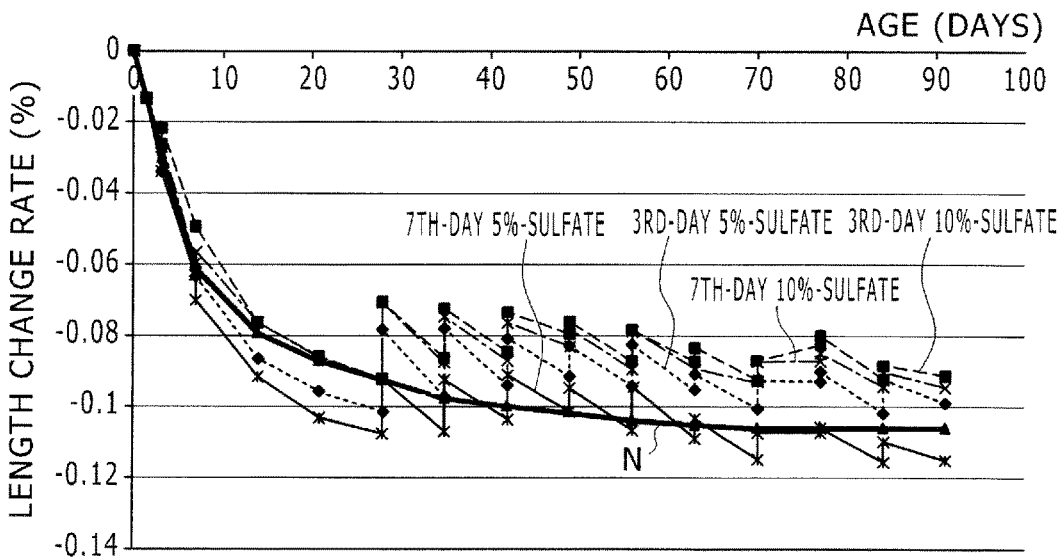
[Fig. 13]
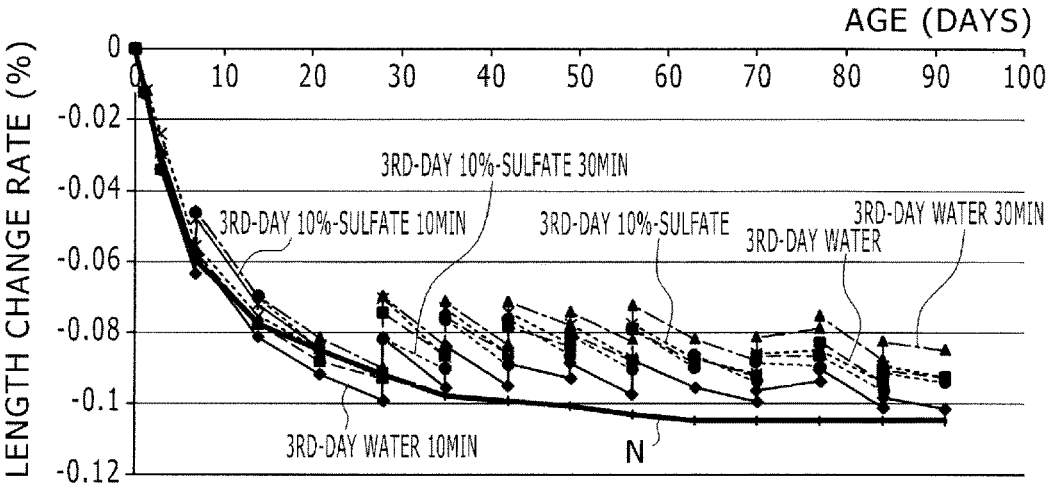

[Fig. 14]
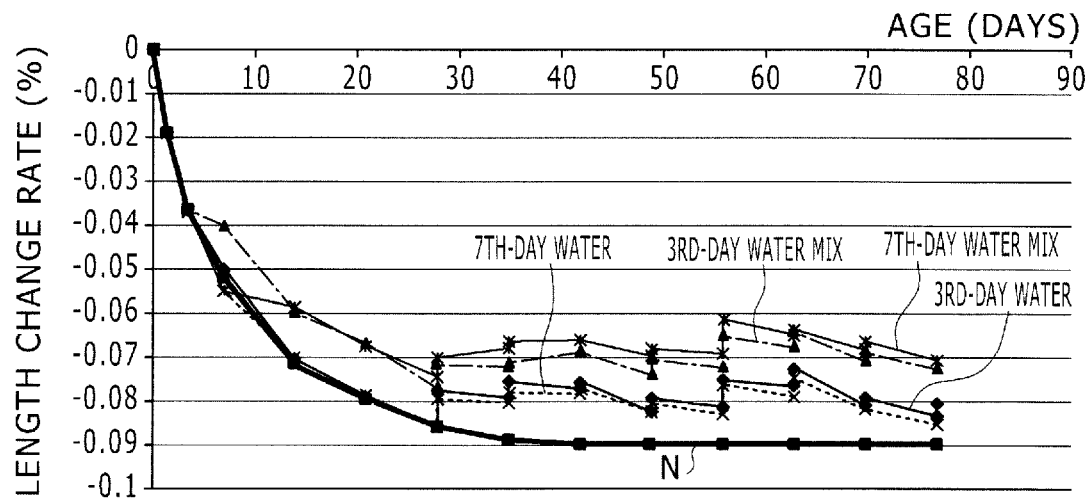
[Fig. 15]
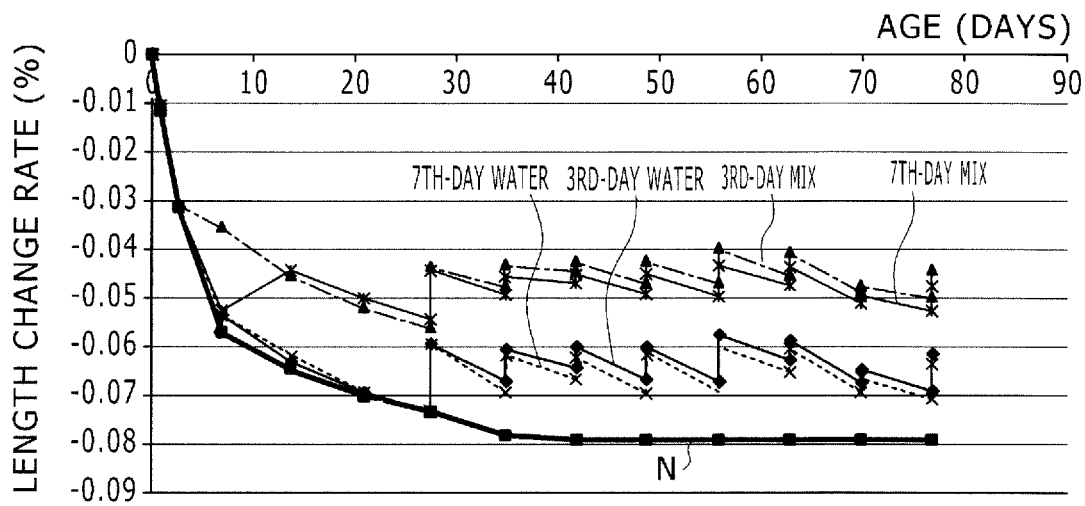
[Fig. 16]
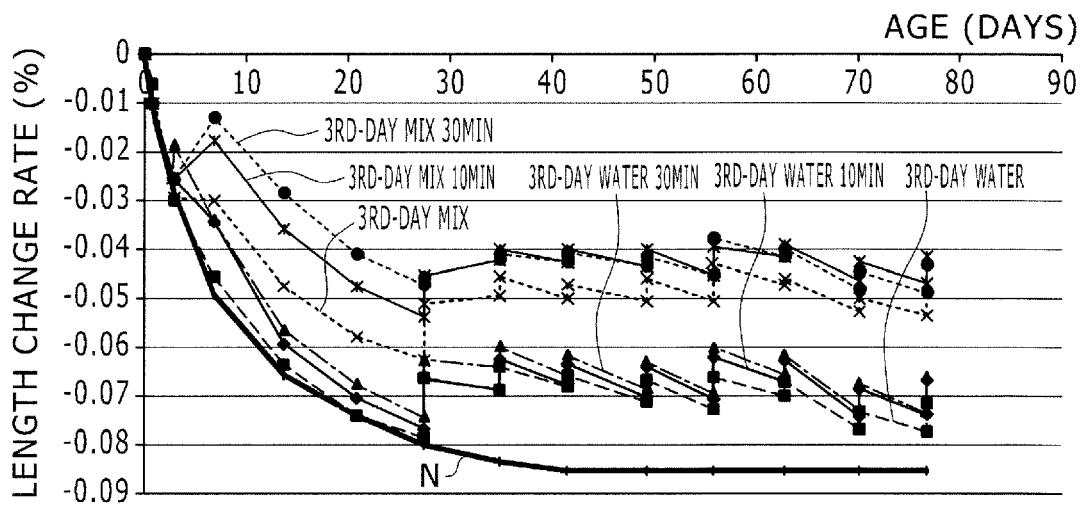

[Fig. 17]
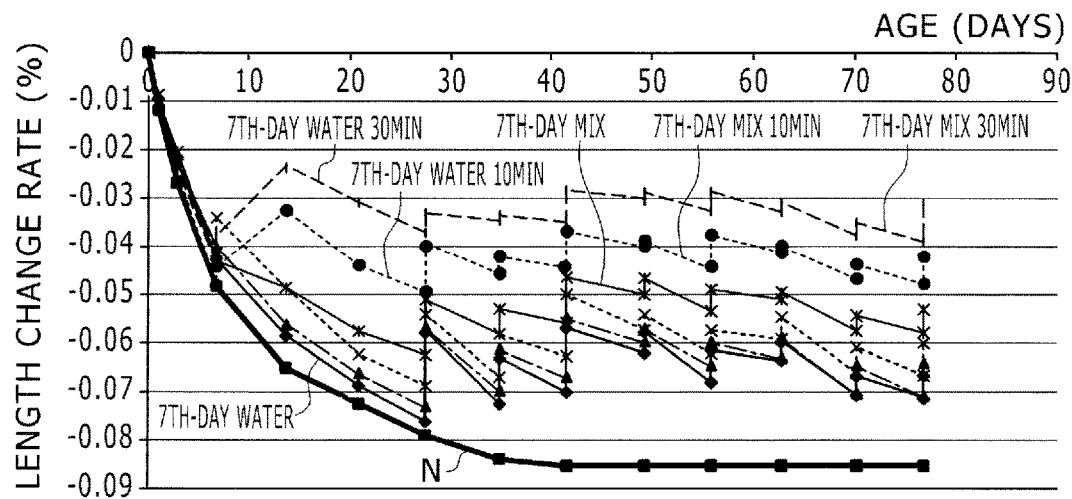
[Fig. 18]
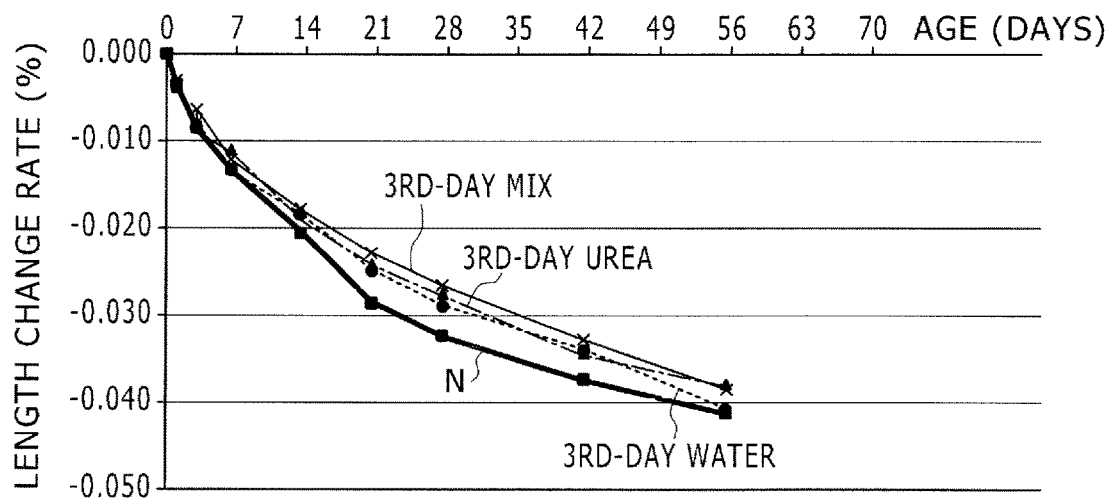
[Fig. 19]
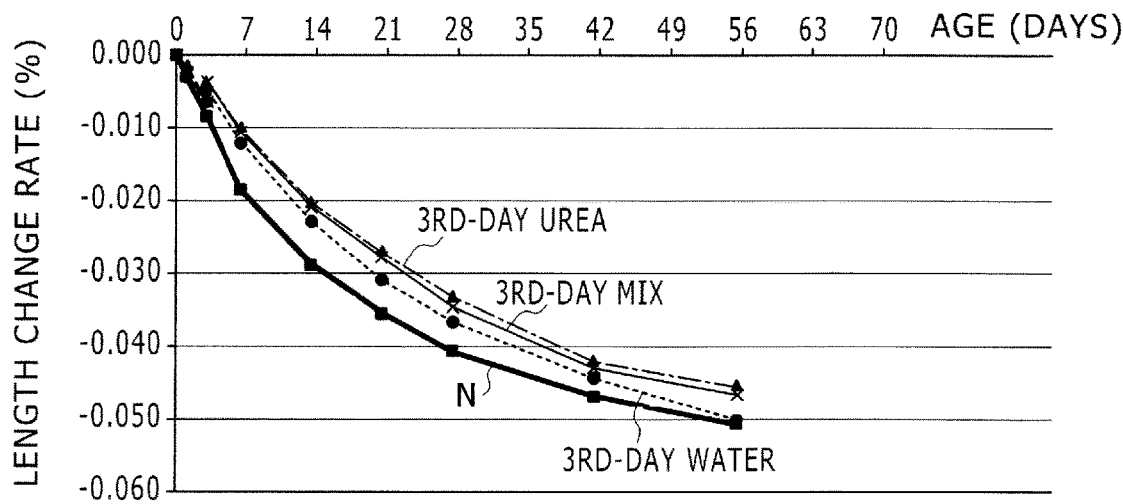

DRYING SHRINKAGE REDUCTION METHOD OF CEMENT-BASED HARDENED BODY

TECHNICAL FIELD

This invention relates to a drying shrinkage reduction method for suppressing drying shrinkage of a cement-based hardened body such as concrete and mortar and/or its strength deterioration caused by the drying shrinkage.

BACKGROUND ART

Heretofore, an expansive admixture, a drying shrinkage reducing agent and a limestone aggregate or the like have been used to suppress cracking caused by shrinkage of mortar and/or concrete, in which case, however, an increase in the cost is caused.

Examples of a commercially-available shrinkage reducing agent for concrete include a concrete admixture for ready-mixed concrete (by Taiheiyo Materials Corporation, under the trade name "Taiheiyo Tetra-guard AS21", for instance), which mainly contains a lower alcohol-alkylene oxide adduct.

Meanwhile, examples of a commercially-available shrinkage reducing agent applied to the surface of hardened concrete and/or mortar in order to reduce drying shrinkage of such concrete and/or mortar include a coating-type shrinkage reducing agent (by Flowric Co., Ltd, under the trade name "Nutte-guard" (a registered trademark), for instance), which mainly contains such components as a glycol ether-based derivative which is a type of nonionic surfactant.

A patent document 1 as one of the prior art documents, for instance, discloses a method of preventing the occurrence of cracking by impregnating the inner surface of a rectangular precast product with an organic drying shrinkage reducing agent such as a nonionic surfactant.

Other patent documents 2 to 5 disclose the arts relating to coating and/or impregnation treatments with a surface modifying agent for improvement in quality of concrete.

Besides, a non-patent document 1 states that urea is effective as a concrete admixture to reduce thermal cracking and/or drying shrinkage cracking of concrete after hardened, and also states various properties of concrete using urea on the basis of some experimental results.

CITATION LIST

Patent Literature

PTL 1: Japanese Unexamined Patent Application Publication No. Sho 62-027386
PTL 2: Japanese Unexamined Patent Application Publication No. 2008-260687
PTL 3: Japanese Unexamined Patent Application Publication No. 2013-253015
PTL 4: Japanese Unexamined Patent Application Publication No. 2015-034119
PTL 5: Japanese Unexamined Patent Application Publication No. 2015-189628

Non Patent Literature

NPL 1: "Various Properties of Concrete Using Urea" by Toru KAWAI and Kenji HANDA, Annual Concrete Research and Technology, Vol. 29, No. 1, 2007, Pages 639 to 644

SUMMARY OF INVENTION

Technical Problem

As mentioned above, the conventional arts for drying shrinkage reduction of concrete involve problems of the cost and/or the time and labor.

Also, drying shrinkage reduction effects of concrete when admixed with urea are known, as stated in the non-patent document 1. However, since such known effects have been based on the art of admixing concrete with urea, there have been no arts of coating a concrete surface with a solution containing urea so far.

By contrast, the inventor of the present application found out that the surface of hardened mortar and/or concrete is impregnated with a solution containing urea, not as an admixture, whereby a drying shrinkage reduction effect of such mortar and/or concrete is obtained.

However, since the urea is easy to dissolve in water, there seems to be a possibility that the drying shrinkage reduction effect would be reduced due to the occurrence of elution of the urea when a concrete structure or the like is exposed to wind and rain after being coated with the urea. In regard to the inside or the like of a building structure, it is not exposed to wind and rain and thus causes no particular problem, while for an exterior structure, there is a need to take into account that even if it is exposed to wind and rain, the drying shrinkage reduction effect should be maintained.

The present invention is developed under such circumstances, and its object is to provide a drying shrinkage reduction method of a cement-based hardened body, in which the surface of hardened mortar and/or concrete is impregnated with a solution containing urea or a solution containing sulfate in addition to urea, not as an admixture, whereby a drying shrinkage reduction effect of such mortar and/or concrete is realizable economically and efficiently.

Solution to Problem

A drying shrinkage reduction method of a cement-based hardened body according to the present invention is characterized in that the surface of a cement-based hardened body such as concrete and mortar after demolding is impregnated with a solution containing urea or a solution containing sulfate in addition to urea.

An impregnation treatment given to the cement-based hardened body with the solution containing urea or both urea and sulfate may be by a method of immersing the cement-based hardened body in the solution for a predetermined period of time, so long as the cement-based hardened body is a relatively small-sized precast product or like product capable of being handled as a movable single body.

For buildings and/or structures, a method of coating the surface of the cement-based hardened body with the solution containing urea or both urea and sulfate is applicable to the impregnation treatment. Alternatively, spraying is also applicable depending on the circumstances.

The solution containing urea or both urea and sulfate may be a solution prepared by simply dissolving urea or both urea and sulfate in water. Since the urea itself is inexpensive, the solution containing urea in a state of being dissolved in water may be used as a very inexpensive drying shrinkage reducing agent.

Alternatively, it may be possible also to apply a liquid other than water for use of a solution containing urea or both urea and sulfate in a state of being dissolved in such liquid. There are no particular limitations on the liquid allowing dissolution of the urea and the sulfate, so long as it causes no impairment of the drying shrinkage reduction effect based on both the urea and the sulfate.

Alternatively, it may be possible also to apply a liquid having a drying shrinkage reduction effect in itself as the liquid to be used instead of water for use of a solution containing urea or both urea and sulfate in a state of being dissolved in such liquid.

Preferable examples of the liquid having the drying shrinkage reduction effect include a nonionic surfactant, and specifically, a drying shrinkage reducing agent containing a glycol ether-based derivative or like drying shrinkage reducing agent is commercially available, for instance. Alternatively, a mixture of the nonionic surfactant and water may be used as well.

The nonionic surfactant is assumed to allow the urea or both the urea and the sulfate to easily permeate the hardened body by reducing surface tension, and further, the drying shrinkage reduction effect based on the nonionic surfactant itself is expectable as well.

Since there are no particular limitations on a urea concentration in the solution, and besides, the urea is relatively inexpensive, an increase in the drying shrinkage reduction effect is expected by increasing the quantity of urea within a range which does not cause any other significant demerits.

As the sulfate for the impregnation treatment with the solution containing sulfate in addition to urea, metal sulfate such as alkaline metal sulfate and alkaline earth metal sulfate is mainly applicable, and specifically, while there are no particular limitations on the sulfate so long as it is not of insoluble type, it is preferable to use sodium sulfate, magnesium sulfate, potassium sulfate, sodium hydrogen sulfate or like easily water-soluble sulfate, and further, the sodium sulfate is more preferable among them since it is not only inexpensive but also easy to handle. Alternatively, these sulfates may be used in combination as well.

In regard to the actions of the sulfate in the present invention, it is considered that unreacted aluminate C3A in cement is allowed to react with sulfate ions to form ettringite, resulting in the occurrence of an expansion reaction in a surface part of the cement hardened body. For the sodium sulfate or the like, it is considered also that an aggregate in the surface part of the cement hardened body causes an alkali aggregate reaction in the presence of Na ions, resulting in the occurrence of the expansion reaction in the surface part thereof.

Since there are no particular limitations on the urea concentration in the solution, and besides, the urea is relatively inexpensive, an increase in the drying shrinkage reduction effect is expected by increasing the quantity of urea within a range which does not cause any other significant demerits.

More specifically, while there seems to be some influence of a mix proportion and a quality or the like of mortar and/or concrete to be treated, the urea concentration in the solution is preferably not less than 20% (mass %), more preferably, in the range of 30 to 60% (mass %) so as to allow expectation for a sufficient drying shrinkage reduction effect.

Since there are no particular limitations on a sulfate concentration in the solution as well, and besides, the sulfate such as sodium sulfate is inexpensive in general, continuance of the drying shrinkage reduction effect based on the urea is expected by increasing the quantity of sulfate within a range which allows dissolution of the sulfate (which range differs depending on temperatures).

More specifically, while there seems to be some influence of a mix proportion and a quality or the like of mortar and/or concrete to be treated, the sulfate concentration in the solution is preferably not less than 1% (mass %), more preferably, in the range of 3 to 15% (mass %). For the sodium sulfate as the sulfate, its concentration is preferably not less than 1% (mass %), more preferably, in the range of 3 to 15% (mass %) as well.

In regard to a ratio (mass) on compounding of the urea and the sulfate, a ratio of urea to sulfate is preferably in the range of 20:1 to 4:1, more preferably, 10:1 to 4:1. For the sodium sulfate as the sulfate, a ratio of urea to sodium sulfate is preferably in the range of 20:1 to 4:1, more preferably, 10:1 to 4:1 as well.

While a desirable time when the impregnation treatment should be given is assumed to be immediately after demolding or within about a few days after demolding, it is possible to cover the demerits of a timewise lag to some extents by increasing the urea and/or sulfate concentration and lengthening an impregnation time, or alternatively, deepening the degree of impregnation.

When the surface of the hardened body is exposed to wind and rain, there seems to be a possibility that use of only the urea would lead to a reduction in the drying shrinkage reduction effect, since the urea is easy to dissolve in water. In regard to the inside of a building structure, it is not exposed to wind and rain and is thus considered to cause no particular problem. Otherwise, a waterproof treatment given to the surface as needed is also taken into account.

By contrast, according to the drying shrinkage reduction method of the cement-based hardened body in the present invention, an impregnation treatment given to the surface of the cement-based hardened body with the solution containing both urea and sulfate is effective in suppressing the occurrence of elution of the urea even when such cement-based hardened body surface is exposed to wind and rain, and thus allows the drying shrinkage reduction effect to be maintained, it is possible to exhibit a sufficient drying shrinkage reduction effect even for exterior structures or the like.

Advantageous Effects of the Invention

Since a coating treatment given to the concrete after demolding with the solution prepared by dissolving urea in water allows expectation for an effect of reducing the drying shrinkage by about 20 to 40%, and besides, the urea is very inexpensive, a substantial reduction in the cost for shrinkage reduction becomes possible.

The quantity of urea used is lessened, as compared with that when the concrete is admixed with the urea. Further, the work is easy, as compared with that when the mortar and/or concrete is admixed with the urea.

Even for the solution prepared by dissolving both urea and sulfate in water, since only the coating treatment given to the concrete after demolding with such solution allows expectation for a substantial drying shrinkage reduction effect, and besides, the urea and the sulfate are very inexpensive, a substantial reduction in the cost for shrinkage reduction becomes possible.

Since the impregnation treatment given to the surface of the cement-based hardened body with the solution containing sulfate in addition to urea is effective in suppressing the occurrence of elution of the urea even when such cement-based hardened body surface is exposed to wind and rain, and thus allows the drying shrinkage reduction effect to be maintained, it is possible to exhibit a sufficient drying shrinkage reduction effect even for the exterior structures or the like.

BRIEF DESCRIPTION OF DRAWINGS

FIG. 1 is a graph showing a relation between an age (days) and a length change rate (%) in an experiment 1-1 (a water/cement ratio of 40%).

FIG. 2 is a graph showing a relation between an age (days) and a length change rate (%) in an experiment 1-2 (a water/cement ratio of 60%).

FIG. 3 is a graph showing a relation between an age (days) and a length change rate (%) in an experiment 1-3 on the basis of comparison results obtained when changing a urea concentration, in regard to an impregnation treatment given with urea on the third day after demolding.

FIG. 4 is a graph showing a relation between an age (days) and a length change rate (%) in the experiment 1-3 on the basis of comparison results obtained when changing a urea concentration, in regard to an impregnation treatment given with urea on the seventh day after demolding.

FIG. 5 is a graph showing a relation between an age (days) and a length change rate (%) in the experiment 1-3 on the basis of comparison results obtained when changing a urea solution immersion time, in regard to an impregnation treatment given with urea on the third day after demolding.

FIG. 6 is a graph showing a relation between an age (days) and a length change rate (%) in the experiment 1-3 on the basis of comparison results obtained when changing a urea solution immersion time, in regard to an impregnation treatment given with urea on the seventh day after demolding.

FIG. 7 is a graph showing a relation between an age (days) and a length change rate (%) in the experiment 1-3, in regard to an impregnation treatment with a commercially-available drying shrinkage reducing agent solution and that with an aqueous solution of a commercially-available premixed cross-section restoring mortar material, as comparative examples.

FIG. 8 is a graph showing a relation between an age (days) and a length change rate (%) in the experiment 1-3, in regard to an impregnation treatment with a solution prepared by dissolving urea in an aqueous solution of a commercially-available premixed cross-section restoring material and that with a solution prepared by dissolving urea in a mixture of a commercially-available drying shrinkage reducing agent solution and the above aqueous solution.

FIG. 9 is a graph showing a relation between an age (days) and a length change rate (%) in an experiment 2-1 (a water/cement ratio of 40%).

FIG. 10 is a graph showing a relation between an age (days) and a length change rate (%) in an experiment 2-2 (a water/cement ratio of 60%).

FIG. 11 is a graph showing a relation between an age (days) and a length change rate (%) in an experiment 2-3 (a water/cement ratio of 50%) when changing a sodium sulfate solution immersion time (on the third day after demolding).

FIG. 12 is a graph showing a relation between an age (days) and a length change rate (%) in the experiment 2-3 (a water/cement ratio of 50%) when changing a sodium sulfate concentration.

FIG. 13 is a graph showing a relation between an age (days) and a length change rate (%) in the experiment 2-3 (a water/cement ratio of 50%) when changing a sodium sulfate solution immersion time (on the seventh day after demolding).

FIG. 14 is a graph showing a relation between an age (days) and a length change rate (%) in an experiment 3-1 (a water/cement ratio of 40%).

FIG. 15 is a graph showing a relation between an age (days) and a length change rate (%) in an experiment 3-2 (a water/cement ratio of 60%).

FIG. 16 is a graph showing a relation between an age (days) and a length change rate (%) in an experiment 3-3 (a water/cement ratio of 50%) when changing an immersion time (on the third day after demolding).

FIG. 17 is a graph showing a relation between an age (days) and a length change rate (%) in the experiment 3-3 (a water/cement ratio of 50%) when changing an immersion time (on the seventh day after demolding).

FIG. 18 is a graph showing a relation between an age (days) and a length change rate (%) in an experiment 4-1 (a water/cement ratio of 40%).

FIG. 19 is a graph showing a relation between an age (days) and a length change rate (%) in an experiment 4-2 (a water/cement ratio of 60%).

DESCRIPTION OF EMBODIMENTS

Hereinafter will be described specific examples of a drying shrinkage reduction method of a cement-based hardened body according to the present invention with reference to the following experiments conducted to confirm the resultant effects, as compared with those based on comparative examples.

Example 1

Firstly, an example 1 will be described on a drying shrinkage reduction effect resulting from an impregnation treatment given to the surface of a cement-based hardened body after demolding with a solution containing urea (a solution containing no sulfate) (experiments 1-1 to 1-3).

(Experiment 1-1)

An experiment 1-1 was conducted to confirm the effects resulting from an impregnation treatment given to a usual mortar hardened body having a water/cement ratio of 40% with water containing urea.

(1) Experimental Conditions

Conditions of the experiment are shown on a table 1 below.

TABLE 1

| w/c | s/c | Target flow value (15 times of rodding) | Immersion condition | Immersion time (min) | Immersion date (after demolding) | Symbol |
|---|---|---|---|---|---|---|
| 40% | 1.2 | 200 ± 10 (mm) | None | | | N |
| | | | Water | 1 | Third day | 3rd-day water |
| | | | | | Seventh day | 7th-day water |

TABLE 1-continued

| w/c | s/c | Target flow value (15 times of rodding) | Immersion condition | Immersion time (min) | Immersion date (after demolding) | Symbol |
|---|---|---|---|---|---|---|
| | | | 50% urea | 1 | Third day<br>Seventh day | 3rd-day urea<br>7th-day urea |

Wherein
c: Ordinary portland cement,
w: Water,
s: River sand, and

Urea concentration=urea(g)/(urea(g)+water(g))=50%

Symbols given to specimens in the table 1 represent the following conditions respectively.

N: No impregnation treatment

3rd-day water: Immersion of specimen in water for one minute on the third day after demolding 7th-day water: Immersion of specimen in water for one minute on the seventh day after demolding 3rd-day urea: Immersion of specimen in solution containing urea at concentration of 50% for one minute on the third day after demolding 7th-day urea: Immersion of specimen in solution containing urea at concentration of 50% for one minute on the seventh day after demolding The experiment 1-1 was conducted also to examine whether or not the resultant effects based on urea are affected by a water immersion treatment (first immersion) given to each specimen at the age of 91 days (13 weeks) and a water re-immersion treatment (second immersion) given to each specimen at the age of 119 days (17 weeks).

(2) Experimental Results

Results of the experiment are shown in FIG. 1.

FIG. 1 is a graph showing an age (days) after demolding on its horizontal axis and a length change rate (%) on is vertical axis.

A specimen (N) given no impregnation treatment resulted in about a 0.112% reduction in the length by the age of 91 days due to drying shrinkage, and afterwards, the length thereof was maintained approximately constant.

A specimen (3rd-day water) immersed in water for one minute on the third day after demolding resulted in about a 0.106% reduction in the length by the age of 91 days due to drying shrinkage, wherein although a recovery of the length to about −0.082% in the length change rate was once allowed thanks to the first immersion, the length change rate came to be about −0.110% at the age of 119 days due to the rapid progressing of the drying shrinkage following such recovery of the length, and further, although a recovery of the length to about −0.092% in the length change rate was once allowed thank to the second immersion, the length change rate at the age of 147 days (21 weeks) came to be about −0.112% as being approximately equal to that of the specimen (N), and further, that at the age of 182 days (26 weeks) came to be about −0.120% as being greater than that of the specimen (N).

A specimen (7th-day water) immersed in water for one minute on the seventh day after demolding resulted in about a 0.114% reduction in the length by the age of 91 days due to drying shrinkage, wherein although a recovery of the length to about −0.087% in the length change rate was once allowed thanks to the first immersion, the length change rate came to be about −0.119% at the age of 119 days due to the rapid progressing of the drying shrinkage following such recovery of the length, and further, although a recovery of the length to about −0.100% in the length change rate was once allowed thanks to the second immersion, the length change rate at the age of 147 days (21 weeks) and that at the age of 182 days (26 weeks) respectively came to be about −0.123% and about −0.132% as being greater than that of the specimen (N).

A specimen (3rd-day urea) immersed in a solution containing urea at a concentration of 50% for one minute on the third day after demolding resulted in about a 0.090% reduction in the length by the age of 91 days due to drying shrinkage, wherein although a recovery of the length to about 0.066% in the length change rate was once allowed thanks to the first immersion, the length change rate came to be about −0.089% at the age of 119 days due to the rapid progressing of the drying shrinkage following such recovery of the length, and further, although a recovery of the length to about −0.072% in the length change rate was once allowed thanks to the second immersion, the length change rate at the age of 147 days (21 weeks) and that at the age of 182 days (26 weeks) were respectively about −0.090% and about −0.098%.

A specimen (7th-day urea) immersed in a solution containing urea at a concentration of 50% for one minute on the seventh day after demolding resulted in about a 0.090% reduction in the length by the age of 91 days due to drying shrinkage, wherein although a recovery of the length to about 0.075% in the length change rate was once allowed thanks to the first immersion, the length change rate came to be about −0.100% in the length change rate by the age of 119 days due to the rapid progressing of the drying shrinkage following such recovery of the length, and further, although a recovery of the length to about −0.085% in the length change rate was once allowed thanks to the second immersion, the length change rate at the age of 147 days (21 weeks) and that at the age of 182 days (26 weeks) were respectively about −0.102% and about −0.110%.

(3) Conclusions

It is confirmed by the experiment 1-1 that the impregnation treatment given to the surface of the mortar hardened body with the solution prepared by dissolving the urea in water allows about a 10 to 20% reduction in the drying shrinkage of the hardened body to be obtained, as compared with the case of no impregnation treatment and/or the impregnation treatment with water.

Incidentally, as to whether or not the drying shrinkage reduction effect is affected by the water immersion treatment given at the age of 91 days and the age of 119 days, it is confirmed that a gap in the length change rate between the specimens (3rd-day urea) and (7th-day urea) has somewhat widened.

(Experiment 1-2)

An experiment 1-2 was conducted to confirm the effects resulting from an impregnation treatment given to a usual mortar hardened body having a water/cement ratio of 60% with water containing urea.

(1) Experimental Conditions
Conditions of the experiment are shown on a table 2 below.

TABLE 2

| w/c | s/c | Target flow value (15 times of rodding) | Immersion condition | Immersion time (min) | Immersion date (after demolding) | Symbol |
|---|---|---|---|---|---|---|
| 60% | 2.4 | 200 ± 10 (mm) | None | | | N |
| | | | Water | 1 | Third day | 3rd-day water |
| | | | | | Seventh day | 7th-day water |
| | | | 50% urea | 1 | Third day | 3rd-day urea |
| | | | | | Seventh day | 7th-day urea |

Wherein
c: Ordinary portland cement
w: Water
s: River sand

Urea concentration=urea(g)/(urea(g)+water(g))=50%

Symbols given to specimens in the Table 2 represent the following conditions respectively.
N: No impregnation treatment
3rd-day water: Immersion of specimen in water for one minute on the third day after demolding
7th-day water: Immersion of specimen in water for one minute on the seventh day after demolding
3rd-day urea: Immersion of specimen in solution containing urea at concentration of 50% for one minute on the third day after demolding
7th-day urea: Immersion of specimen in solution containing urea at concentration of 50% for one minute on the seventh day after demolding The experiment 1-2 was conducted also to examine whether or not the resultant effects based on urea are affected by a water immersion treatment (first immersion) given to each specimen at the age of 91 days (13 weeks) and a water re-immersion treatment (second immersion) given to each specimen at the age of 119 days (17 weeks).

(2) Experimental Results
Results of the experiment are shown in FIG. 2.
FIG. 2 is a graph showing an age (days) after demolding on its horizontal axis and a length change rate (%) on its vertical axis.

A specimen (N) given no impregnation treatment resulted in about a 0.108% reduction in the length by the age of 91 days due to drying shrinkage, and there was a length change to about −0.112% in the length change rate at the age of 147 days (21 weeks).

A specimen (3rd-day water) immersed in water for one minute on the third day after demolding resulted in about a 0.104% reduction in the length by the age of 91 days due to drying shrinkage, wherein although a recovery of the length to about −0.083% in the length change rate was once allowed thanks to the first immersion, the length change rate came to be about −0.109% at the age of 119 days due to the rapid progressing of the drying shrinkage following such recovery of the length, and further, although a recovery of the length to about −0.087% in the length change rate was once allowed thanks to the second immersion, the length change rate at the age of 147 days (21 weeks) came to be about −0.114% as being approximately equal to that of the specimen (N), and further, that at the age of 182 days (26 weeks) came to be about −0.121% as being greater than that of the specimen (N).

A specimen (7th-day water) immersed in water for one minute on the seventh day after demolding resulted in about a 0.112% reduction in the length by the age of 91 days due to drying shrinkage, wherein although a recovery of the length to about −0.088% in the length change rate was once allowed thanks to the first immersion, the length change rate came to be about −0.117% at the age of 119 days due to the rapid progressing of the drying shrinkage following such recovery of the length, and further, although a recovery of the length to about −0.094% in the length change rate was once allowed thanks to the second immersion, the length change rate at the age of 147 days (21 weeks) and that at the age of 182 days (26 weeks) respectively came to be about −0.122% and about −0.130% as being greater than that of the specimen (N).

A specimen (3rd-day urea) immersed in a solution containing urea at a concentration of 50% for one minute on the third day after demolding resulted in about a 0.072% reduction in the length by the age of 91 days due to drying shrinkage, wherein although a recovery of the length to about −0.052% in the length change rate was once allowed thanks to the first immersion, the length change rate came to be about −0.076% at the age of 119 days due to the rapid progressing of the drying shrinkage following such recovery of the length, and further, although a recovery of the length to about −0.055% in the length change rate was once allowed thanks to the second immersion, the length change rate at the age of 147 days (21 weeks) and that at the age of 182 days (26 weeks) were respectively about −0.077% and about −0.086%.

A specimen (7th-day urea) immersed in a solution containing urea at a concentration of 50% for one minute on the seventh day after demolding resulted in about a 0.078% reduction in the length by the age of 91 days due to drying shrinkage, wherein although a recovery of the length to about 0.058% in the length change rate was once allowed thanks to the first immersion, the length change rate came to be about −0.078% at the age of 119 days due to the rapid progressing of the drying shrinkage following such recovery of the length, and further, although a recovery of the length to about −0.060% in the length change rate was once allowed thanks to the second immersion, the length change rate at the age of 147 days (21 weeks) and that at the age of 182 days (26 weeks) were respectively about −0.080% and about −0.088%.

(3) Conclusions
It is confirmed by the experiment 1-2 that the impregnation treatment given to the surface of the mortar hardened body with the solution prepared by dissolving the urea in water allows about a 30% reduction in the drying shrinkage of the hardened body to be obtained, as compared with the case of no impregnation treatment and/or the impregnation treatment with water.

Incidentally, as to whether or not the drying shrinkage reduction effect is affected by the water immersion treatment given at the age of 91 days and the age of 119 days, it is confirmed that a gap in the length change rate between the specimens (3rd-day urea) and (7th-day urea) has somewhat narrowed.

(Experiment 1-3)

An experiment 1-3 was conducted to confirm the effects obtained further when changing a urea concentration, when changing a urea solution immersion time and when dissolving urea in a liquid other than water, with reference to the results of the experiments 1-1 and 1-2.

(1) Experimental Conditions

Conditions of the experiment are shown on a table 3 below.

TABLE 3

| w/c | s/c | Target flow value (15 times of rodding) | Immersion condition | Immersion time (min) | Immersion date (after demolding) | Symbol |
|---|---|---|---|---|---|---|
| 60% | 1.7 | 200 ± 10 (mm) | None | | | N |
| | | | Water | 1 | Third day | 3rd-day water |
| | | | | | Seventh day | 7th-day water |
| | | | | 10 | Third day | 3rd-day water 10 min |
| | | | | | Seventh day | 7th-day water 10 min |
| | | | | 30 | Third day | 3rd-day water 30 min |
| | | | | | Seventh day | 7th-day water 30 min |
| | | | 30% urea | 1 | Third day | 3rd-day 30%-urea |
| | | | | | Seventh day | 7th-day 30%-urea |
| | | | 40% urea | 1 | Third day | 3rd-day 40%-urea |
| | | | | | Seventh day | 7th-day 40%-urea |
| | | | 50% urea | 1 | Third day | 3rd-day 50%-urea |
| | | | | | Seventh day | 7th-day 50%-urea |
| | | | | 10 | Third day | 3rd-day 50%-urea 10 min |
| | | | | | Seventh day | 7th-day 50%-urea 10 min |
| | | | | 30 | Third day | 3rd-day 50%-urea 30 min |
| | | | | | Seventh day | 7th-day 50%-urea 30 min |
| | | | NG | 1 | Third day | 3rd-day NG |
| | | | | | Seventh day | 7th-day NG |
| | | | NF1000 | 1 | Third day | 3rd-day NF1000 |
| | | | | | Seventh day | 7th-day NF1000 |
| | | | Urea + NF1000 | 1 | Third day | 3rd-day urea + NF |
| | | | | | Seventh day | 7th-day urea + NF |
| | | | Urea + NF1000 + NG | 1 | Third day | 3rd-day urea + NF + NG |
| | | | | | Seventh day | 7th-day urea + NF + NG |

Wherein c: Ordinary portland cement w: Water s: River sand

Urea concentration=urea(g)/urea(g)+water,NG or NF1000(g))

NG: Product by Flowric Co., Ltd, under the trade name "Nutte-guard" (a registered trademark)

NF1000: Dilute solution prepared by diluting a material, which is by DPS Bridge Works Co., Ltd, under the trade name "Naoshitaru NF" ("Naoshitaru" is a registered trademark), 1000 times (a weight ratio) with water It is noted that the above material "Naoshitaru NF" is commercially available as a premixed cross-section restoring mortar material prepared by adding components such as nylon fibers and a nonionic surfactant for drying shrinkage reduction to main powder components such as ordinary cement, silica fume and blast furnace slag fine powder.

Symbols given to specimens in the table 3 represent the following conditions respectively.

N: No impregnation treatment

3rd-day water: Immersion of specimen in water for one minute on the third day after demolding 7th-day water: Immersion of specimen in water for one minute on the seventh day after demolding 3rd-day water 10 min: Immersion of specimen in water for 10 minutes on the third day after demolding 7th-day water 10 min.: Immersion of specimen in water for 10 minutes on the seventh day after demolding 3rd-day water 30 min: Immersion of specimen in water for 30 minutes on the third day after demolding 7th-day water 30 min: Immersion of specimen in water for 30 minutes on the seventh day after demolding 3rd-day 30%-urea: Immersion of specimen in solution containing urea at concentration of 30% for one minute on the third day after demolding 7th-day 30%-urea: Immersion of specimen in solution containing urea at concentration of 30% for one minute on the seventh day after demolding 3rd-day 40%-urea: Immersion of specimen in solution containing urea at concentration of 40% for one minute on the third day after demolding 7th-day 40%-urea: Immersion of specimen in solution containing urea at concentration of 40% for one minute on the seventh day after demolding 3rd-day 50%-urea: Immersion of specimen in solution containing urea at concentration of 50% for one minute on the third day after demolding 7th-day 50%-urea: Immersion of specimen in solution containing urea at concentration of 50% for one minute on the seventh day after demolding 3rd-day 50%-urea 10 min: Immersion of specimen in solution containing urea at concentration of 50% for 10 minutes on the third day after demolding 7th-day 50%-urea 10 min: Immersion of specimen in solution containing urea at concentration of 50% for 10 minutes on the seventh day after demolding 3rd-day 50%-urea 30 min: Immersion of specimen in solution containing urea at concentration of 50% for 30 minutes on the third day after demolding 7th-day 50%-urea 30 min: Immersion of specimen in solution containing urea at concentration of 50% for 30 minutes on the seventh day after demolding 3rd-day NG: Immersion of specimen in NG solution for one minute on the third day after demolding 7th-day NG: Immersion of specimen in NG solution for one minute on the seventh day after demolding 3rd-day NF: Immersion of specimen in NF-1000 solution for one minute on the third day after demolding 7th-day NF: Immersion of specimen in NF-1000 solution for one minute on the seventh day after demolding 3rd-day urea+NF: Immersion of specimen in NF-1000 solution containing urea at concentration of 50% for one minute on the third day after demolding 7th-day urea+NF: Immersion of specimen in NF-1000 solution containing urea at concentration of 50% for one minute on the seventh day after demolding Urea concentration=urea(g)/(urea(g)+NF1000(g))

3rd-day urea+NF+NG: Immersion of specimen in mixture of NF-1000 solution containing urea at concentration of 50% and NG solution for one minute on the third day after demolding 7th-day urea+NF+NG: Immersion of specimen in mixture of NF-1000 solution containing urea at concentration of 50% and NG solution for one minute on the seventh day after demolding Urea concentration=urea(g)/urea(g)+NF1000(g)+NG(g))

NF1000 (g)=NG (g)

The experiment 1-3 was conducted also to examine whether or not the resultant effects based on urea are affected by a water immersion treatment (first immersion) given to each specimen at the age of 91 days (13 weeks) and a water re-immersion treatment (second immersion) given to each specimen at the age of 119 days (17 weeks).

(2) Experimental Results

Results of the experiment are shown in FIGS. 3 to 7.

FIG. 3 is a graph showing a relation between an age (days) and a length change rate (%) in the experiment 1-3 when changing a urea concentration (3rd-day 30%-urea, 3rd-day 40%-urea and 3rd-day 50%-urea), in regard to an impregnation treatment given with urea on the third day after demolding.

At the point of the age of 91 days (13 weeks), a drying shrinkage reduction effect of about 23% was found in the specimens 3rd-day 30%-urea and 3rd-day 40%-urea, while that of about 33% was found in the specimen 3rd-day 50%-urea.

At the point of the age of 119 days (17 weeks) after two times of the water immersion treatment in the middle of the experiment, there were a drying shrinkage reduction effect of about 27% in the specimen 3rd-day 30%-urea, that of about 30% in the specimen 3rd-day 40%-urea and that of about 37% in the specimen 3rd-day 50%-urea.

The result was a remarkable difference in the drying shrinkage reduction effect between the condition of 30% urea concentration and that of 50% urea concentration, while a difference in the drying shrinkage reduction effect between the condition of 30% urea concentration and that of 40% urea concentration was not remarkable.

FIG. 4 is a graph showing a relation between an age (days) and a length change rate (%) in the experiment 1-3 when changing a urea concentration (7th-day 30%-urea, 7th-day 40%-urea and 7th-day 50%-urea), in regard to an impregnation treatment given with urea on the seventh day after demolding.

At the point of the age of 91 days (13 weeks), a drying shrinkage reduction effect of about 9% was found in the specimen 7th-day 30%-urea, that of about 6% was found in the specimen 7th-day 40%-urea, and that of about 19% was found in the specimen 7th-day 50%-urea.

At the point of the age of 119 days (17 weeks) after two times of the water immersion treatment in the middle of the experiment, there were a drying shrinkage reduction effect of about 9% in the specimen 7th-day 30%-urea, that of about 11% in the specimen 7th-day 40%-urea and that of about 16% in the specimen 7th-day 50%-urea.

Meanwhile, for the impregnation treatment given with the urea on the seventh day after demolding, the result was also a remarkable difference in the drying shrinkage reduction effect between the condition of 30% urea concentration and that of 50% urea concentration, while a difference in the drying shrinkage reduction effect between the condition of 30% urea concentration and that of 40% urea concentration was not remarkable, and further, there was a tendency similar to that shown in the impregnation treatment given with the urea on the third day after demolding.

However, as to the drying shrinkage reduction effect, a greater effect is exhibited in the case of the impregnation treatment given with the urea on the third day after demolding, as compared with the impregnation treatment given with the urea on the seventh day after demolding.

FIG. 5 is a graph showing a relation between an age (days) and a length change rate (%) in the experiment 1-3 when changing an immersion time, with the urea concentration controlled to 50% (3rd-day 50%-urea, 3rd-day 50%-urea 10 min, and 3rd-day 50%-urea 30 min), in regard to an impregnation treatment given with urea on the third day after demolding, in contrast to the specimens (3rd-day water, 3rd-day water 10 min and 3rd-day water 30 min) immersed in water containing no urea.

Referring to the specimens immersed in water containing no urea, there was almost no difference in the length change rate between the specimen 3rd-day water (immersed for one minute) and the specimen 3rd-day water 10 min, whereas an increase in the length change rate was found in the specimen 3rd-day water 30 min. This shows that the water immersion treatment for a long period of time causes the drying shrinkage after hardening to get larger, in cases where the specimen was given the water immersion treatment relatively early as soon as the third day after demolding.

Meanwhile, for the specimens immersed in water containing the urea (at the urea concentration of 50%), it is found that as the immersion time becomes longer in the order of one minute, 10 minutes and 30 minutes, a greater drying shrinkage reduction effect is obtained. This seems to be because the immersion treatment was given in a state where the urea is allowed to permeate the hardened body inwards more deeply from its surface.

FIG. 6 is a graph showing a relation between an age (days) and a length change rate (%) in the experiment 1-3 when changing an immersion time, with the urea concentration controlled to 50% (7th-day 50%-urea, 7th-day 50%-urea 10 min and 7th-day 50%-urea 30 min), in regard to an impregnation treatment given with urea on the seventh day after demolding, in contrast to the specimens (7th-day water, 7th-day water 10 min and 7th-day water 30 min) immersed in water containing no urea.

Referring to the specimens immersed in water containing no urea, there was no remarkable difference in the length change rate among the specimens 7th-day water (immersed for one minute), 7th-day water 10 min and 7th-day water 30 min.

Meanwhile, for the specimens immersed in water containing the urea (at the urea concentration of 50%), it is found that as the immersion time becomes longer in the order of one minute, 10 minutes and 30 minutes, a greater drying shrinkage effect is obtained, like the impregnation treatment given with the urea on the third day after demolding, while for the specimen 7th-day 50%-urea having a short immersion time as much as one minute, such specimen was greatly different in the drying shrinkage reduction effect from the specimen 3rd-day 50%-urea allowing more exhibition of the drying shrinkage reduction effect as shown in FIG. 5, whereas differences in the drying shrinkage reduction effect between the specimens 7th-day 50%-urea 10 min and 7th-day 50%-urea 30 min and the specimens 3rd-day 50%-urea 10 min and 3rd-day 50%-urea 30 min shown in FIG. 5 have been gradually reduced.

FIG. 7 is a graph showing a relation between an age (days) and a length change rate (%) in the experiment 1-3 on the basis of comparison results obtained in regard to an impregnation treatment with a commercially-available drying shrinkage reducing agent solution and that with an aqueous solution of a commercially-available premixed cross-section restoring mortar material (3rd-day NG, 7th-day NG, 3rd-day NF and 7th-day NF).

Referring to the specimens 3rd-day NG and 7th-day NG both using a coating-type drying shrinkage reducing agent solution, the drying shrinkage reduction effect was found, in contrast to the specimen N given no impregnation treatment, while such effect was nearly equal to that of the specimen 3rd-day 50%-urea in FIG. 3 and that of the specimen 7th-day 50%-urea in FIG. 4 both having the same other conditions as the specimens 3rd-day NG and 7th-day NG.

Referring to the specimen 3rd-day NF and 7th-day NF both prepared by diluting a commercially-available cross-section restoring mortar material 1000 times (a weight ratio) with water, there was no remarkable difference in the drying shrinkage reduction effect between these specimens and the specimen N given no impregnation treatment.

FIG. 8 is a graph showing a relation between an age (days) and a length change rate (%) in the experiment 1-3, in regard to an impregnation treatment with a solution prepared by dissolving urea in an aqueous solution of a commercially-available premixed cross-section restoring material and that with a solution prepared by dissolving urea in a mixture of a commercially-available drying shrinkage reducing agent solution and the above aqueous solution (3rd-day urea+NF, 7th-day urea+NF, 3rd-day urea+NF+NG, and 7th-day urea+NF+NG).

The result was that the drying shrinkage reduction effect is confirmed even when using the solution prepared by dissolving the urea in the solution other than the water, while for the mortar used in the experiment 1-3, there was no remarkable difference in the drying shrinkage reduction effect between the condition of using water and that of using the solution other than water.

(3) Conclusions

As the result of comparison in various cases on the urea concentration, the immersion time and the application of dissolution of the urea in the solution other than water, it is confirmed by the experiment 1-3 that there is a tendency to obtain a greater drying shrinkage reduction effect, as the urea concentration becomes higher, and the immersion time becomes longer. It is also confirmed that a higher urea concentration and a longer immersion time result in lessening in influences of the number of days spent from demolding to the immersion treatment.

COMPARATIVE EXAMPLES

Comparative examples will now be described on a drying shrinkage reduction effect resulting from an impregnation treatment given to the surface of a cement-based hardened body after demolding with a solution containing sulfate (experiments 2-1 to 2-3).

(Experiment 2-1)

An experiment 2-1 was conducted to confirm the presence/absence of the effects resulting from an impregnation treatment given to a usual mortar hardened body having a water/cement ratio of 40% with water containing sodium sulfate $Na_2SO_4$ which is a type of metal sulfate.

(1) Experimental Conditions

Conditions of the experiment are shown on a table 4 below.

TABLE 4

| w/c | s/c | Target flow value (15 times of rodding) | Immersion condition | Immersion time (min) | Immersion date (after demolding) | Symbol |
| --- | --- | --- | --- | --- | --- | --- |
| 40% | 1.2 | 200 ± 10 (mm) | None | | | N |
| | | | Water | 1 | Third day | 3rd-day water |
| | | | | | Seventh day | 7th-day water |
| | | | 10% $Na_2SO_4$ | 1 | Third day | 3rd-day sulfate |
| | | | | | Seventh day | 7th-day sulfate |

Wherein
c: Ordinary portland cement
w: Water
s: River sand $Na_2SO_4$ concentration=$Na_2SO_4$(g)/($Na_2SO_4$(g)+water (g))=10%

Symbols given to specimens in the table 4 represent the following conditions respectively.

N: No impregnation treatment

3rd-day water: Immersion of specimen in water for one minute on the third day after demolding 7th-day water: Immersion of specimen in water for one minute on the seventh day after demolding 3rd-day sulfate: Immersion of specimen in solution containing $Na_2SO_4$ at concentration of 10% for one minute on the third day after demolding 7th-day sulfate: Immersion of specimen in solution containing $Na_2SO_4$ at concentration of 10% for one minute on the seventh day after demolding The experiment 2-1 was conducted in the case of a water/cement ratio of 40% to examine whether or not the resultant effects based on sulfate (sodium sulfate $Na_2SO_4$) are affected by a water immersion treatment given to each specimen every week in the period from the age of 28 days (4 weeks) to the age of 91 days (13 weeks).

(2) Experimental Results

Results of the experiment are shown in FIG. 9.

FIG. 9 is a graph showing an age (days) after demolding on its horizontal axis and a length change rate (%) at its vertical axis.

A specimen (N) given no impregnation treatment resulted in about a 0.116% reduction in the length by the age of 91 days due to drying shrinkage.

A specimen (3rd-day water) immersed in water for one minute on the third day after demolding resulted in about a 0.096% reduction in the length by the age of 91 days (13 weeks), with length change rate fluctuations resulting from the water immersion treatment given to each specimen every week after the age of 28 days (4 weeks).

A specimen (7th-day water) immersed in water for one minute on the seventh day after demolding resulted in about a 0.097% reduction in the length by the age of 91 days (13 weeks), with length change rate fluctuations resulting from the water immersion treatment given to each specimen every week after the age of 28 days (4 weeks).

A specimen (3rd-day sulfate) immersed in a solution containing $Na_2SO_4$ at a concentration of 10% for one minute on the third day after demolding resulted in about a 0.099% reduction in the length by the age of 91 days (13 weeks), with length change rate fluctuations resulting from the water immersion treatment given to each specimen every week after the age of 28 days (4 weeks).

A specimen (7th-day sulfate) immersed in a solution containing $Na_2SO_4$ at a concentration of 10% for one minute on the seventh day after demolding resulted in about a 0.093% reduction in the length by the age of 91 days (13 weeks), with length change rate fluctuations resulting from the water immersion treatment given to each specimen every week after the age of 28 days (4 weeks).

(3) Conclusions

As the result of comparison in drying shrinkage and hardening of the hardened body between the case of the impregnation treatment given to the surface of the mortar hardened body with the solution containing the sodium sulfate and that of no impregnation treatment and/or the impregnation treatment with water, it is confirmed by the experiment 2-2 that there is no remarkable difference in the effect, as compared with the impregnation treatment with water, and therefore, it is guessed that use of the sodium sulfate singly is less effective in reducing the drying shrinkage.

(Experiment 2-2)

An experiment 2-2 was conducted to confirm the presence/absence of the effects resulting from an impregnation treatment given to a usual mortar hardened body having a water/cement ratio of 60% with water containing sodium sulfate $Na_2SO_4$ as the sulfate.

(1) Experimental Conditions

Conditions of the experiment are shown on a table 5 below.

TABLE 5

| w/c | s/c | Target flow value (15 times of rodding) | Immersion condition | Immersion time (min) | Immersion date (after demolding) | Symbol |
|---|---|---|---|---|---|---|
| 60% | 2.4 | 200 ± 10 (mm) | None | | | N |
| | | | Water | 1 | Third day | 3rd-day water |
| | | | | | Seventh day | 7th-day water |
| | | | 10% $Na_2SO_4$ | 1 | Third day | 3rd-day sulfate |
| | | | | | Seventh day | 7th-day sulfate |

Wherein c: Ordinary portland cement w: Water s: River sand $Na_2SO_4$ concentration=$Na_2SO_4(g)/(Na_2SO_4(g)+\text{water}(g))$=10%

Symbols given to specimens in the table 5 represent the following conditions respectively.

N: No impregnation treatment

3rd-day water: Immersion of specimen in water for one minute on the third day after demolding 7th-day water: Immersion of specimen in water for one minute on the seventh day after demolding 3rd-day sulfate: Immersion of specimen in solution containing $Na_2SO_4$ at concentration of 10% for one minute on the third day after demolding 7th-day sulfate: Immersion of specimen in solution containing $Na_2SO_4$ at concentration of 10% for one minute on the seventh day after demolding The experiment 2-2 was conducted in the case of a water/cement ratio of 60% to examine whether or not the resultant effects based on sulfate (sodium sulfate $Na_2SO_4$) are affected by a water immersion treatment given to each specimen every week in the period from the age of 28 days to the age of 91 days (13 weeks).

(Experimental Results)

Results of the experiment are shown in FIG. 10.

FIG. 10 is a graph showing an age (days) after demolding on its horizontal axis and a length change rate (%) on its vertical axis.

A specimen (N) given no impregnation treatment resulted in about a 0.113% reduction in the length by the age of 91 days due to drying shrinkage.

A specimen (3rd-day water) immersed in water for one minute on the third day after demolding resulted in about a 0.085% reduction in the length by the age of 91 days (13 weeks), with length change rate fluctuations resulting from the water immersion treatment given to each specimen every week after the age of 28 days (4 weeks).

A specimen (7th-day water) immersed in water for one minute on the seventh day after demolding resulted in about a 0.085% reduction in the length by the age of 91 days (13 weeks), with length change rate fluctuations resulting from the water immersion treatment given to each specimen every week after the age of 28 days (4 weeks).

A specimen (3rd-day sulfate) immersed in a solution containing $Na_2SO_4$ at a concentration of 10% for one minute on the third day after demolding resulted in about a 0.089% reduction in the length by the age of 91 days (13 weeks), while length change rate fluctuations resulting from the water immersion treatment given to each specimen every week after the age of 28 days (4 weeks).

A specimen (7th-day sulfate) immersed in a solution containing $Na_2SO_4$ at a concentration of 10% for one minute on the seventh day after demolding resulted in about a 0.089% reduction in the length by the age of 91 days (13 weeks), with length change rate fluctuations resulting from the water immersion treatment given to each specimen every week after the age of 28 days (4 weeks).

(3) Conclusions

As the result of comparison in drying shrinkage and hardening of the hardened body between the case of the impregnation treatment given to the surface of the mortar hardened body with the solution containing the sodium sulfate and that of no impregnation treatment and/or the impregnation treatment with water, like the experiment 2-1, it is confirmed by the experiment 2-2 that there is no remarkable difference in the effect, as compared with the impregnation treatment with water, and therefore, it is guessed that use of the sodium sulfate singly is less effective in reducing the drying shrinkage.

(Experiment 2-3)

An experiment 2-3 was conducted to confirm the presence/absence of the effects obtained further when changing a sodium sulfate solution immersion time and when changing a sodium sulfate concentration, with reference to the results of the experiments 2-1 and 2-2. It is noted that a mortar hardened body was prepared at a water/cement ratio of 50%.

(1) Experimental Conditions

Conditions of the experiment are shown in a table 6 below.

3rd-day water 10 min: Immersion of specimen in water for 10 minutes on the third day after demolding 7th-day water 10 min: Immersion of specimen in water for 10 minutes on the seventh day after demolding 3rd-day water 30 min: Immersion of specimen in water for 30 minutes on the third day after demolding 7th-day water 30 min: Immersion of specimen in water for 30 minutes on the seventh day after demolding 3rd-day 5%-sulfate: Immersion of specimen in solution containing $Na_2SO_4$ at concentration of 5% for one minute on the third day after demolding 7th-day 5%-sulfate: Immersion of specimen in solution containing $Na_2SO_4$ at concentration of 5% for one minute on the seventh day after demolding 3rd-day 10%-sulfate: Immersion of specimen in solution containing $Na_2SO_4$ at concentration of 10% for one minute on the third day after demolding 7th-day 10%-sulfate: Immersion of specimen in solution containing $Na_2SO_4$ at concentration of 10% for one minute on the seventh day after demolding 3rd-day 10%-sulfate 10 min: Immersion of specimen in solution containing $Na_2SO_4$ at concentration of 10% for 10 minutes on the third day after demolding 7th-day 10%-sulfate 10 min: Immersion of specimen in solution containing $Na_2SO_4$ at concentration of 10% for 10 minutes on the seventh day after demolding 3rd-day 10%-sulfate 30 min: Immersion of specimen in solution containing $Na_2SO_4$ at concentration of 10% for 30 minutes on the third day after demolding 7th-day 10%-sulfate 30 min: Immersion of specimen in solution containing $Na_2SO_4$ at concentration of 10% for 30 minutes on the seventh day after demolding $Na_2SO_4$ concentration=$Na_2SO_4$ (g)/($Na_2SO_4$ (g)+ water (g))

TABLE 6

| w/c | s/c | Target flow value (15 times of rodding) | Immersion condition | Immersion time (min) | Immersion date (after demolding) | Symbol |
|---|---|---|---|---|---|---|
| 50% | 1.7 | 200 ± 10 (mm) | None | | | N |
| | | | Water | 1 | Third day | 3rd-day water |
| | | | | | Seventh day | 7th-day water |
| | | | | 10 | Third day | 3rd-day water 10 min |
| | | | | | Seventh day | 7th-day water 10 min |
| | | | | 30 | Third day | 3rd-day water 30 min |
| | | | | | Seventh day | 7th-day water 30 min |
| | | | 5% $Na_2SO_4$ | 1 | Third day | 3rd-day 5%-sulfate |
| | | | | | Seventh day | 7th-day 5%-sulfate |
| | | | 10% $Na_2SO_4$ | 1 | Third day | 3rd-day 10%-sulfate |
| | | | | | Seventh day | 7th-day 10%-sulfate |
| | | | | 10 | Third day | 3rd-day 10%-sulfate 10 min |
| | | | | | Seventh day | 7th-day 10%-sulfate 10 min |
| | | | | 30 | Third day | 3rd-day 50%-sulfate 30 min |
| | | | | | Seventh day | 7th-day 50%-sulfate 30 min |

Wherein c: Ordinary portland cement w: Water s: River sand

Symbols given to specimens in the table 6 represent the following conditions respectively.

N: No impregnation treatment

3rd-day water: Immersion of specimen in water for one minute on the third day after demolding 7th-day water: Immersion of specimen in water for one minute on the seventh day after demolding (2) Experimental Results Results of the experiment are shown in FIGS. 11 to 13.

FIG. 11 is a graph showing a relation between an age (days) and a length change rate (%) in the experiment 2-3 when changing a sodium sulfate solution immersion time (3rd-day 10%-sulfate, 3rd-day 10%-sulfate 10 min and 3rd-day 10%-sulfate 30 min), in regard to the case where after an impregnation treatment with sodium sulfate on the third day after demolding, a water immersion treatment was given to each specimen every week in the period from the age of 28 days (4 weeks) to the age of 91 days (13 weeks).

A specimen given no impregnation treatment resulted in about a 0.105% reduction in the length by the age of 91 days due to drying shrinkage.

A specimen (3rd-day water) immersed in water for one minute on the third day after demolding resulted in about a 0.095% reduction in the length by the age of 91 days (13 weeks), with length change rate fluctuations resulting from the water immersion treatment given to each specimen every week after the age of 28 days (4 weeks).

A specimen (3rd-day water 10 min) immersed in water for 10 minutes on the third day after demolding resulted in about a 0.093% reduction in the length by the age of 91 days (13 weeks), with length change rate fluctuations resulting from the water immersion treatment given to each specimen every week after the age of 28 days (4 weeks).

A specimen (3rd-day water 30 min) immersed in water for 30 minutes on the third day after demolding resulted in about a 0.089% reduction in the length by the age of 91 days (13 weeks), with length change rate fluctuations resulting from the water immersion treatment given to each specimen every week after the age of 28 days (4 weeks).

A specimen (3rd-day 10%-sulfate) immersed in a solution containing sodium sulfate at a concentration of 10% for one minute on the third day after demolding resulted in about a 0.090% reduction in the length by the age of 91 days (13 weeks), with length change rate fluctuations resulting from the water immersion treatment given to each specimen every week after the age of 28 days (4 weeks).

A specimen (3rd-day 10%-sulfate 10 min) immersed in a solution containing sodium sulfate at a concentration of 10% for 10 minutes on the third day after demolding resulted in about a 0.095% reduction in the length by the age of 91 days (13 weeks), with length change rate fluctuations resulting from the water immersion treatment given to each specimen every week after the age of 28 days (4 weeks).

A specimen (3rd-day 10%-sulfate 30 min) immersed in a solution containing sodium sulfate at a concentration of 10% for 30 minutes on the third day after demolding resulted in about a 0.098% reduction in the length by the age of 91 days (13 weeks), with length change rate fluctuations resulting from the water immersion treatment given to each specimen every week after the age of 28 days (4 weeks).

FIG. 12 is a graph showing a relation between an age (days) and a length change rate (%) in the experiment 2-3 when changing a sodium sulfate concentration (3rd-day 5%-sulfate, 7th-day 5%-sulfate, 3rd-day 10%-sulfate and 7th-day 10%-sulfate).

A specimen (N) given no impregnation treatment resulted in about a 0.105% reduction in the length by the age of 91 days due to drying shrinkage, as shown also in FIG. 11.

A specimen (3rd-day 5%-sulfate) immersed in a solution containing sodium sulfate at a concentration of 5% for one minute on the third day after demolding resulted in about a 0.098% reduction in the length by the age of 91 days (13 weeks), with length change rate fluctuations resulting from the water immersion treatment given to each specimen every week after the age of 28 days (4 weeks).

A specimen (7th-day 5%-sulfate) immersed in a solution containing sodium sulfate at a concentration of 5% for one minute on the seventh day after demolding resulted in about a 0.115% reduction in the length by the age of 91 days (13 weeks), with length change rate fluctuations resulting from the water immersion treatment given to each specimen every week after the age of 28 days (4 weeks).

A specimen (3rd-day 10%-sulfate) immersed in a solution containing sodium sulfate at a concentration of 10% for one minute on the third day after demolding resulted in about a 0.090% reduction in the length by the age of 91 days (13 weeks), with length change rate fluctuations resulting from the water immersion treatment given to each specimen every week after the age of 28 days (4 weeks).

A specimen (7th-day 10%-sulfate) immersed in a solution containing sodium sulfate at a concentration of 10% for one minute on the seventh day after demolding resulted in about a 0.095% reduction in the length by the age of 91 days (13 weeks), with length change rate fluctuations resulting from the water immersion treatment given to each specimen every week after the age of 28 days (4 weeks).

FIG. 13 is a graph showing a relation between an age (days) and a length change rate (%) in the experiment 2-3 when changing a sodium sulfate solution immersion time (7th-day 10%-sulfate, 7th-day 10%-sulfate 10 min and 7th-day 10%-sulfate 30 min), in regard to the case where after an impregnation treatment with sodium sulfate on the seventh day after demolding, each specimen was given a water immersion treatment every week in the period from the age of 28 days (4 weeks) to the age of 91 days (13 weeks).

A specimen (N) given no impregnation treatment resulted in about a 0.105% reduction in the length by the age of 91 days due to drying shrinkage, as shown also in FIGS. 11 and 12.

A specimen (7th-day water) immersed in water for one minute on the seventh day after demolding resulted in about a 0.093% reduction in the length by the age of 91 days (13 weeks), with length change rate fluctuations resulting from the water immersion treatment given to each specimen every week after the age of 28 days (4 weeks), A specimen (7th-day water 10 min) immersed in water for 10 minutes on the seventh day after demolding resulted in about a 0.102% reduction in the length by the age of 91 days (13 weeks), with length change rate fluctuations resulting from the water immersion treatment given to each specimen every week after the age of 28 days (4 weeks).

A specimen (7th-day water 30 min) immersed in water for 30 minutes on the seventh day after demolding resulted in about a 0.086% reduction in the length by the age of 91 days (13 weeks), with length change rate fluctuations resulting from the water immersion treatment given to each specimen every week after the age of 28 days (4 weeks).

A specimen (7th-day 10%-sulfate) immersed in a solution containing sodium sulfate at a concentration of 10% for one minute on the seventh day after demolding resulted in about a 0.093% reduction in the length by the age of 91 days (13 weeks), with length change rate fluctuations resulting from the water immersion treatment given to each specimen every week after the age of 28 days (4 weeks).

A specimen (7th-day 10%-sulfate 10 min) immersed in a solution containing sodium sulfate at a concentration of 10% for 10 minutes on the seventh day after demolding resulted in about a 0.093% reduction in the length by the age of 91 days (13 weeks), with length change rate fluctuations resulting from the water immersion treatment given to each specimen every week after the age of 28 days (4 weeks).

A specimen (7th-day 10%-sulfate 30 min) immersed in a solution containing sodium sulfate at a concentration of 10% for 30 minutes on the seventh day after demolding resulted in about a 0.095% reduction in the length by the age of 91 days (13 weeks), with length change rate fluctuations resulting from the water immersion treatment given to each specimen every week after the age of 28 days (4 weeks).

(3) Conclusions

It is confirmed by the experiment 2-3 that a difference appears in the magnitude of drying shrinkage depending on a difference of the sodium sulfate solution immersion time and/or the sodium sulfate concentration, in which case, however, it cannot be said that the impregnation treatment with the sodium sulfate is effective in reducing the drying shrinkage as compared with the impregnation treatment with water, and therefore, it is guessed that use of the sodium sulfate singly is less effective in reducing the drying shrinkage.

Example 2

An example 2 of the present invention will now be described on a drying shrinkage reduction effect resulting from an impregnation treatment given to the surface of a cement-based hardened body after demolding with a solution containing both urea and sulfate (experiments 3-1 to 3-3, 4-1 and 4-2)

(Experiment 3-1)

An experiment 3-1 was conducted to confirm the effects resulting from an impregnation treatment given to a usual mortar hardened body having a water/cement ratio of 40% with water (a mixture of solution containing urea at a concentration of 50% and solution containing sodium sulfate at a concentration of 10%) containing both urea and sodium sulfate $Na_2SO_4$ which is a type of metal sulfate.

(1) Experimental Conditions

Conditions of the experiment are shown on a table 7 below.

TABLE 7

| w/c | s/c | Target flow value (15 times of rodding) | Immersion condition | Immersion time (min) | Immersion date (after demolding) | Symbol |
|---|---|---|---|---|---|---|
| 40% | 1.2 | 200 ± 10 (mm) | None | | | N |
| | | | Water | 1 | Third day | 3rd-day water |
| | | | | | Seventh day | 7th-day water |
| | | | mix | 1 | Third day | 3rd-day mix |
| | | | | | Seventh day | 7th-day mix |

Wherein
c: Ordinary portland cement
w: Water
s: River sand
mix: [sodium sulfate:water:urea=1:9:10 (mass)]

Symbols given to specimens in the table 7 represent the following conditions respectively.

N: No impregnation treatment
3rd-day water: Immersion of specimen in water for one minute on the third day after demolding
7th-day water: Immersion of specimen in water for one minute on the seventh day after demolding
3rd-day mix: Immersion of specimen in solution containing both urea and sodium sulfate for one minute on the third day after demolding
7th-day mix: Immersion of specimen in solution containing both urea and sodium sulfate for one minute on the seventh day after demolding The experiment 3-1 was conducted also to examine whether or not the resultant effects are affected by a water immersion treatment given to each specimen every week in the period from the age of 28 days (4 weeks) to the age of 77 days (11 weeks).

(2) Experimental Results

Results of the experiment are shown in FIG. 14.

FIG. 14 is a graph showing an age (days) after demolding on its horizontal axis and a length change rate (%) at its vertical axis.

A specimen (N) given no impregnation treatment resulted in about a 0.090% reduction in the length by the age of 48 days due to drying shrinkage, and afterwards, the length thereof was maintained approximately constant.

A specimen (3rd-day water) immersed in water for one minute on the third day after demolding resulted in about a 0.082% reduction in the length by the age of 77 days (11 weeks), with length change rate fluctuations resulting from the water immersion treatment given to each specimen every week after the age of 28 days (4 weeks).

A specimen (7th-day water) immersed in water for one minute on the seventh day after demolding resulted in about a 0.084% reduction in the length by the age of 77 days (11 weeks), with length change rate fluctuations resulting from the water immersion treatment given to each specimen every week after the age of 28 days (4 weeks).

A specimen (3rd-day mix) immersed in a mixture of urea solution and sodium sulfate solution for one minute on the third day after demolding resulted in about a 0.072% reduction in the length by the age of 77 days (11 weeks), with length change rate fluctuations resulting from the water immersion treatment given to each specimen every week after the age of 28 days (4 weeks).

A specimen (7th-day mix) immersed in a mixture of urea solution and sodium sulfate solution for one minute on the seventh day after demolding resulted in about a 0.070% reduction in the length by the age of 77 days (11 weeks), with length change rate fluctuations resulting from the water immersion treatment given to each specimen every week after the age of 28 days (4 weeks).

(3) Conclusions

It is confirmed by the experiment 3-1 that the impregnation treatment given to the surface of the mortar hardened body with the mixture prepared by dissolving both urea and sodium sulfate in water allows about a 15 to 20% reduction in the drying shrinkage of the hardened body to be obtained at the point of the age of 77 days (11 weeks), as compared with the case of no impregnation treatment and/or the impregnation treatment with water.

It is also confirmed that in the process of the water immersion treatment given to each specimen every week after the age of 28 days (4 weeks), the drying shrinkage reduction effect is maintained, and further, in regard to the comparison with the experiment 1-1 conducted on condition of using the solution containing only the urea, any reduction in the drying shrinkage reduction effect due to the water immersion treatment is not found, unlike the experiment 1-1. Therefore, use of the mixture of urea solution and sodium sulfate solution allows expectation for continuance of the drying shrinkage reduction effect even for exterior structures or like structures exposed to wind and rain.

(Experiment 3-2)

An experiment 3-2 was conducted to confirm the effects resulting from an impregnation treatment given to a usual mortar hardened body having a water/cement ratio of 60% with water containing both urea and sodium sulfate $Na_2SO_4$ as the sulfate.

(1) Experimental Conditions

Conditions of the experiment are shown on a table 8 below.

TABLE 8

| w/c | s/c | Target flow value (15 times of rodding) | Immersion condition | Immersion time (min) | Immersion date (after demolding) | Symbol |
|---|---|---|---|---|---|---|
| 60% | 2.4 | 200 ± 10 (mm) | None | | | N |
| | | | Water | 1 | Third day | 3rd-day water |
| | | | | | Seventh day | 7th-day water |
| | | | mix | 1 | Third day | 3rd-day mix |
| | | | | | Seventh day | 7th-day mix |

Wherein c: Ordinary portland cement w: Water s: River sand mix: [sodium sulfate:water:urea=1:9:10 (mass)]

Symbols given to specimens in the table 8 represent the following conditions respectively.

N: No impregnation treatment

3rd-day water: Immersion of specimen in water for one minute on the third day after demolding 7th-day water: Immersion of specimen in water for one minute on the seventh day after demolding 3rd-day mix: Immersion of specimen in solution containing both urea and sodium sulfate for one minute on the third day after demolding 7th-day mix: Immersion of specimen in solution containing both urea and sodium sulfate for one minute on the seventh day after demolding The experiment 3-1 was conducted also to examine whether or not the resultant effects are affected by a water immersion treatment given to each specimen every week in the period from the age of 28 days (4 weeks) to the age of 77 days (11 weeks).

(2) Experimental Results

Results of the experiment are shown in FIG. 15.

FIG. 15 is a graph showing an age (days) after demolding on its horizontal axis and a length change rate (%) on its vertical axis.

A specimen (N) given no impregnation treatment resulted in about a 0.079% reduction in the length by the age of 42 days due to drying shrinkage, and afterwards, the length thereof was maintained approximately constant.

A specimen (3rd-day water) immersed in water for one minute on the third day after demolding resulted in about a 0.068% reduction in the length by the age of 77 days (11 weeks), with length change rate fluctuations resulting from the water immersion treatment given to each specimen every week after the age of 28 days (4 weeks).

A specimen (7th-day water) immersed in water for one minute on the seventh day after demolding resulted in about a 0.070% reduction in the length by the age of 77 days (11 weeks), with length change rate fluctuations resulting from the water immersion treatment given to each specimen every week after the age of 28 days (4 weeks).

A specimen (3rd-day mix) immersed in a mixture of urea solution and sodium sulfate solution for one minute on the third day after demolding resulted in about a 0.050% reduction in the length by the age of 77 days (11 weeks), with length change rate fluctuations resulting from the water immersion treatment given to each specimen every week after the age of 28 days (4 weeks).

A specimen (7th-day mix) immersed in a mixture of urea solution and sodium sulfate solution for one minute on the seventh day after demolding resulted in about a 0.052% reduction in the length by the age of 77 days (11 weeks), with length change rate fluctuations resulting from the water immersion treatment given to each specimen every week after the age of 28 days (4 weeks).

(3) Conclusions

It is confirmed by the experiment 3-2 that the impregnation treatment given to the surface of the mortar hardened body with the mixture prepared by dissolving both urea and sodium sulfate in water allows about a 15 to 35% reduction in the drying shrinkage of the hardened body to be obtained at the point of the age of 77 days (11 weeks), as compared with the case of no impregnation treatment and/or the impregnation treatment with water.

It is also confirmed that the drying shrinkage reduction effect is maintained even under repeated wetting and drying conditions resulting from the water immersion treatment given to each specimen every week after the age of 28 days (4 weeks). Therefore, use of the mixture of urea solution and sodium sulfate solution allows expectation for continuance of the drying shrinkage reduction effect even for exterior structures or like structures exposed to wind and rain.

(Experiment 3-3)

An experiment 3-3 was conducted to confirm the presence/absence of the effects obtained when changing a mixture immersion time, with reference to the results of the experiments 3-1 and 3-2. It is noted that a mortar hardened body was prepared at the water/cement ratio of 50%.

(1) Experimental Conditions

Conditions of the experiment are shown on a table 9 below.

TABLE 9

| w/c | s/c | Target flow value (15 times of rodding) | Immersion condition | Immersion time (min) | Immersion date (after demolding) | Symbol |
|---|---|---|---|---|---|---|
| 50% | 1.7 | 200 ± 10 (mm) | None | | | N |
| | | | Water | 1 | Third day | 3rd-day water |
| | | | | | Seventh day | 7th-day water |
| | | | | 10 | Third day | 3rd-day 10 min |
| | | | | | Seventh day | 7th-day 10 min |
| | | | | 30 | Third day | 3rd-day 30 min |
| | | | | | Seventh day | 7th-day 30 min |
| | | | mix | 1 | Third day | 3rd-day mix |
| | | | | | Seventh day | 7th-day mix |
| | | | | 10 | Third day | 3rd-day mix 10 min |
| | | | | | Seventh day | 7th-day mix 10 min |
| | | | | 30 | Third day | 3rd-day mix 30 min |
| | | | | | Seventh day | 7th-day mix 30 min |

Wherein
c: Ordinary portland cement
w: Water
s: River sand
mix: [sodium sulfate:water:urea=1:9:10 (mass)]

Symbols given to specimens in the table 9 represent the following conditions respectively.

N: No impregnation treatment

3rd-day water: Immersion of specimen in water for one minute on the third day after demolding 7th-day water: Immersion of specimen in water for one minute on the seventh day after demolding 3rd-day water 10 min: Immersion of specimen in water for 10 minutes on the third day after demolding 7th-day water 10 min: Immersion of specimen in water for 10 minutes on the seventh day after demolding 3rd-day water 30 min: Immersion of specimen in water for 30 minutes on the third day after demolding 7th-day water 30 min: Immersion of specimen in water for 30 minutes on the seventh day after demolding 3rd-day mix: Immersion of specimen in solution containing both urea and sodium sulfate for one minute on the third day after demolding 7th-day mix: Immersion of specimen in solution containing both urea and sodium sulfate for one minute on the seventh day after demolding 3rd-day mix 10 min: Immersion of specimen in solution containing both urea and sodium sulfate for 10 minutes on the third day after demolding 7th-day mix 10 min: Immersion of specimen in solution containing both urea and sodium sulfate for 10 minutes on the seventh day after demolding 3rd-day mix 30 min: Immersion of specimen in solution containing both urea and sodium sulfate for 30 minutes on the third day after demolding 7th-day mix 30 min: Immersion of specimen in solution containing both urea and sodium sulfate for 30 minutes on the seventh day after demolding The experiment 3-3 was conducted also to examine whether or not the resultant effects are affected by a water immersion treatment given to each specimen every week in the period from the age of 28 days (4 weeks) to the age of 77 days (11 weeks).

(2) Experimental Results

Results of the experiment are shown in FIGS. 16 and 17.

FIG. 16 is a graph showing a relation between an age (days) and a length change rate (%) in the experiment 3-3 when changing a mixture immersion time (3rd-day mix, 3rd-day mix 10 min, and 3rd-day mix 30 min), in regard to the case where after an impregnation treatment with the mixture prepared by dissolving both urea and sodium sulfate in water on the third day after demolding, each specimen was given a water immersion treatment every week in the period from the age of 28 days (4 weeks) to the age of 91 days (13 weeks).

A specimen (N) given no impregnation treatment resulted in about a 0.086% reduction in the length by the age of 48 days due to drying shrinkage, and afterwards, the length thereof was maintained approximately constant.

A specimen (3rd-day water) immersed in water for one minute on the third day after demolding resulted in about a 0.077% reduction in the length by the age of 77 days (11 weeks), with length change rate fluctuations resulting from the water immersion treatment given to each specimen every week after the age of 28 days (4 weeks).

A specimen (3rd-day water 10 min) immersed in water for 10 minutes on the third day after demolding resulted in about a 0.073% reduction in the length by the age of 77 days (11 weeks), with length change rate fluctuations resulting from the water immersion treatment given to each specimen every week after the age of 28 days (4 weeks).

A specimen (3rd-day water 30 mn) immersed in water for 30 minutes on the third day after demolding resulted in about a 0.073% reduction in the length by the age of 77 days (11 weeks), with length change rate fluctuations resulting from the water immersion treatment given to each specimen every week after the age of 28 days (4 weeks).

A specimen (3rd-day mix) immersed in a mixture of urea solution and sodium sulfate solution for one minute on the third day after demolding resulted in about a 0.053% reduction in the length by the age of 77 days (11 weeks), with length change rate fluctuations resulting from the water immersion treatment given to each specimen every week after the age of 28 days (4 weeks).

A specimen (3rd-day mix 10 min) immersed in a mixture of urea solution and sodium sulfate solution for 10 minutes on the third day after demolding resulted in about a 0.046% reduction in the length by the age of 77 days (11 weeks), with length change rate fluctuations resulting from the water immersion treatment given to each specimen every week after the age of 28 days (4 weeks).

A specimen (3rd-day mix 30 min) immersed in a mixture of urea solution and sodium sulfate solution for 30 minutes on the third day after demolding resulted in about a 0.048% reduction in the length by the age of 77 days (11 weeks), with length change rate fluctuations resulting from the water immersion treatment given to each specimen every week after the age of 28 days (4 weeks).

FIG. 17 is a graph showing a relation between an age (days) and a length change rate (%) in the experiment 3-3 when changing a mixture immersion time (7th-day mix, 7th-day mix 10 min and 7th-day mix 30 min), in regard to the case where after an impregnation treatment with a mixture prepared by dissolving both urea and sodium sulfate in water on the seventh day after demolding, each specimen was given a water immersion treatment every week in the period from the age of 28 days (4 weeks) to the age of 91 days (13 weeks).

A specimen (N) given no impregnation treatment resulted in about a 0.086% reduction in the length by the age of 48 days due to drying shrinkage, and afterwards, the length thereof was maintained approximately constant.

A specimen (7th-day water) immersed in water for one minute on the seventh day after demolding resulted in about a 0.072% reduction in the length by the age of 77 days (11 weeks), with length change rate fluctuations resulting from the water immersion treatment given to each specimen every week after the age of 28 days (4 weeks).

A specimen (7th-day water 10 min) immersed in water for 10 minutes on the seventh day after demolding resulted in about a 0.072% reduction in the length by the age of 77 days (11 weeks), with length change rate fluctuations resulting from the water immersion treatment given to each specimen every week after the age of 28 days (4 weeks).

A specimen (7th-day water 30 min) immersed in water for 30 minutes on the seventh day after demolding resulted in about a 0.066% reduction in the length by the age of 77 days (11 weeks), with length change rate fluctuations resulting from the water immersion treatment given to each specimen every week after the age of 28 days (4 weeks).

A specimen (7th-day mix) immersed in a mixture of urea solution and sodium sulfate solution for one minute on the seventh day after demolding resulted in about a 0.058% reduction in the length by the age of 77 days (11 weeks), with length change rate fluctuations resulting from the water immersion treatment given to each specimen every week after the age of 28 days (4 weeks).

A specimen (7th-day mix 10 min) immersed in a mixture of urea solution and sodium sulfate solution for 10 minutes on the seventh day after demolding resulted in about a 0.048% reduction in the length by the age of 77 days (11 weeks), with length change rate fluctuations resulting from the water immersion treatment given to each specimen every week after the age of 28 days (4 weeks).

A specimen (7th-day mix 30 min) immersed in a mixture of urea solution and sodium sulfate solution for 30 minutes on the seventh day after demolding resulted in about a 0.039% reduction in the length by the age of 77 days (11 weeks), with length change rate fluctuations resulting from the water immersion treatment given to each specimen every week after the age of 28 days (4 weeks).

(3) Conclusions

It is confirmed by the experiment 3-3 that the impregnation treatment given to the surface of the mortar hardened body with the mixture prepared by dissolving both urea and sodium sulfate in water allows about a 30 to 40% reduction in the drying shrinkage of the hardened body to be obtained at the point of the age of 77 days (11 weeks), as compared with the case of no impregnation treatment and/or the impregnation treatment with water.

It is also confirmed that the drying shrinkage reduction effect is maintained even in repeated wetting and drying conditions resulting from the water immersion treatment given to each specimen every week after the age of 28 days (4 weeks). Therefore, use of the mixture of urea solution and sodium sulfate solution allows expectation for continuance of the drying shrinkage reduction effect even for exterior structures or like structures exposed to wind and rain.

For the immersion treatment given to the specimen in the mixture of urea solution and sodium sulfate solution on the seventh day after demolding, it is found that as the immersion time becomes longer in the order of one minute, 10 minutes and 30 minutes, a greater drying shrinkage reduction effect is obtained, while for the immersion treatment given to the specimen in the mixture of urea solution and sodium sulfate solution on the third day after demolding, there is no clear difference in the drying shrinkage reduction effect between the condition of the immersion time of 10 min and that of the immersion time of 30 min at the point of the age of 77 days.

(Experiment 4-1)

The experiments 1-1 to 1-3 in the example 1 and the experiments 3-1 to 3-3 in the example 2 were for the mortar hardened body, whereas an experiment 4-1 was conducted on a concrete hardened body having a water/cement ratio of 40%.

(1) Experimental Conditions

Conditions of the experiment are shown on a table 10 below.

TABLE 10

| w/c | s/a | sp/c | Target slump value | Target air-content value | Immersion condition | Immersion time (min) | Immersion date (after demolding) | Symbol |
|---|---|---|---|---|---|---|---|---|
| 40% | 42.7% | 0.12% | 7 ± 0.5 (cm) | 4.5% | None | | | N |
| | | | | | Water | 1 | Third day | 3rd-day water |
| | | | | | Urea | 1 | Third day | 7th-day urea |
| | | | | | mix | 1 | Third day | 3rd-day mix |

Wherein
c: Ordinary portland cement
w: Water
s: River sand
a: River sand+gravels of No. 6 type
sp: High-performance AE water-reducing agent Urea concentration=urea(g)/(urea(g)+water(g))=50% mix: [sodium sulfate:water:urea=1:9:10 (mass)]

Symbols given to specimens in the table 10 represent the following conditions respectively.

N: No impregnation treatment

3rd-day water: Immersion of specimen in water for one minute on the third day after demolding 3rd-day urea: Immersion of specimen in solution containing urea at concentration of 50% for one minute on the third day after demolding 3rd-day mix: Immersion of specimen in solution containing both urea and sodium sulfate for one minute on the third day after demolding (2) Experimental Results Results of the experiment are shown in FIG. 18.

FIG. 18 is a graph showing an age (days) on its horizontal axis and a length change rate (%) on its vertical axis.

At the point of the age of 56 days (8 weeks), the specimen (3rd-day water) immersed in water for one minute on the third day after demolding had almost the same drying shrinkage reduction effect as the specimen (N) given no impregnation treatment, while the specimen (3rd-day urea) immersed in the solution containing urea for one minute on the third day after demolding resulted in about a 10% reduction in the length change rate, and thus, the drying shrinkage reduction effect was found.

The specimen (3rd-day mix) immersed in the solution containing both urea and sodium sulfate for one minute on the third day after demolding had a smaller length change rate until the age of 42 days (6 weeks) as compared with the specimen (3rd-day urea) immersed in the solution containing urea for one minute on the third day after demolding, and afterwards, came to have almost the same length change rate as the specimen (3rd-day urea) at the age of 56 days (8 weeks), and further, about a 8% reduction in the length change rate was found, in contrast to the specimen N given no impregnation treatment.

(3) Conclusions

It is confirmed by the experiment 4-1 conducted on the concrete that the effects resulting from the impregnation treatment with the solution prepared by dissolving urea or both urea and sodium sulfate in water are relatively small, as compared with the experiments conducted on the mortar, in which case, however, since the concrete is innately smaller than the mortar in the length change rate itself, it is found that there is the drying shrinkage reduction effect even in the concrete as well.

(Experiment 4-2)

An experiment 4-2 was conducted on a concrete hardened body having a water/cement ratio of 60%, like the experiment 4-1.

(1) Experimental Conditions

Conditions of the experiment are shown on a table 11 below.

TABLE 11

| w/c | s/a | sp/c | Target slump value | Target air-content value | Immersion condition | Immersion time (min) | Immersion date (after demolding) | Symbol |
|---|---|---|---|---|---|---|---|---|
| 60% | 49.0% | 0.10% | 8.5 ± 0.5 (cm) | 5.5% | None | | | N |
| | | | | | Water | 1 | Third day | 3rd-day water |
| | | | | | Urea | 1 | Third day | 7th-day urea |
| | | | | | mix | 1 | Third day | 3rd-day mix |

Wherein
c: Ordinary portland cement
w: Water
s: River sand
a: River sand+gravels of No. 6 type
sp: High-performance AE water-reducing agent Urea concentration=urea(g)/(urea(g)+water(g))=50% mix: [sodium sulfate:water:urea=1:9:10 (mass)]

Symbols given to specimens in the table 11 represent the following conditions respectively.

N: No impregnation treatment

3rd-day water: Immersion of specimen in water for one minute on the third day after demolding 3rd-day urea: Immersion of specimen in solution containing urea at concentration of 50% for one minute on the third day after demolding 3rd-day mix: Immersion of specimen in solution containing both urea and sodium sulfate for one minute on the third day after demolding (2) Experimental Results Results of the experiment are shown in FIG. 19.

FIG. 19 is a graph showing an age (days) on its horizontal axis and a length change rate (%) on its vertical axis.

At the point of the age of 56 days (8 weeks), the specimen (3rd-day water) immersed in water for one minute on the third day after demolding had almost the same drying shrinkage reduction effect as the specimen (N) given no impregnation treatment, while the specimen (3rd-day urea) immersed in the solution containing urea for one minute on the third day after demolding resulted in about a 11% reduction in the length change rate, and thus, the drying shrinkage reduction effect was found.

The specimen (3rd-day mix) immersed in the solution containing both urea and sodium sulfate for one minute on the third day after demolding had a smaller length change rate until the age of 42 days (6 weeks) as compared with the specimen (3rd-day urea) immersed in the solution containing urea for one minute on the third day after demolding, and afterwards, came to have almost the same length change rate as the specimen (3rd-day urea) at the age of 56 days (8 weeks), and further, about a 9% reduction in the length change rate was found, in contrast to the specimen (N) given no impregnation treatment.

(3) Conclusions

It is confirmed by the experiment 4-2 conducted on the concrete that there is a tendency approximately similar to that shown in the experiment 4-1 conducted on the concrete, while an innate length change rate itself of the concrete specimen is somewhat increased, as compared with the experiment 4-1 on the higher quality concrete with the water/cement ratio of 40%.

The invention claimed is:

1. A method of reducing drying shrinkage of a cement-based hardened body comprising:

demolding a cement-based hardened body; and impregnating a surface of the cement-based hardened body with a solution containing urea within seven days after the demolding.

2. The method according to claim 1, wherein said solution containing urea is prepared by dissolving urea in water, a nonionic surfactant or a mixture of the nonionic surfactant and the water.

3. The method according to claim 1, wherein the cement-based hardened body is impregnated with said solution containing urea by coating the surface of the cement-based hardened body after the demolding with said solution containing urea.

4. The method according to claim 1, wherein a urea concentration in said solution is not less than 20 mass %.

5. The method according to claim 1, wherein a urea concentration in said solution is in the range of 30 to 60 mass %.

6. The method according to claim 1, wherein the solution further comprises sulfate.

7. The method according to claim 6, wherein the drying shrinkage of the cement-based hardened body is 0.058% in length or less.

8. The method according to claim 6, wherein said solution containing both urea and sulfate is prepared by dissolving urea and sulfate in water, a nonionic surfactant or a mixture of the nonionic surfactant and the water.

9. The method according to claim 6, wherein the cement-based hardened body is impregnated with said solution containing both urea and sulfate by coating the surface of the cement-based hardened body with said solution containing both urea and sulfate.

10. The method according to claim 6, wherein a urea concentration in said solution is not less than 20 mass %.

11. The method according to claim 10, wherein a sulfate concentration in said solution is not less than 1 mass %.

12. The method according to claim 6, wherein a urea concentration in said solution is in the range of 30 to 60 mass %.

13. The method according to claim 12, wherein a sulfate concentration in said solution is in the range of 3 to 15 mass %.

14. The method according to claim 13, wherein a mass ratio of urea to sulfate in said solution is in the range of 10:1 to 4:1.

\* \* \* \* \*